(12) United States Patent
Papanikolopoulos et al.

(10) Patent No.: US 11,275,941 B2
(45) Date of Patent: Mar. 15, 2022

(54) CROP MODELS AND BIOMETRICS

(71) Applicant: Regents of the University of Minnesota, Minneapolis, MN (US)

(72) Inventors: Nikolaos Papanikolopoulos, Minneapolis, MN (US); Vassilios Morellas, Plymouth, MN (US); Dimitris Zermas, Minnetonka, MN (US); David Mulla, Brooklyn Center, MN (US); Mike Bazakos, Bloomington, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/296,941

(22) Filed: Mar. 8, 2019

(65) Prior Publication Data
US 2019/0278988 A1 Sep. 12, 2019

Related U.S. Application Data

(60) Provisional application No. 62/640,455, filed on Mar. 8, 2018, provisional application No. 62/640,447, filed on Mar. 8, 2018.

(51) Int. Cl.
*G06K 9/00* (2006.01)
*G06T 17/00* (2006.01)
(Continued)

(52) U.S. Cl.
CPC ........... *G06K 9/00657* (2013.01); *A01G 2/00* (2018.02); *B64C 39/024* (2013.01); *B64D 47/08* (2013.01);
(Continued)

(58) Field of Classification Search
CPC .......... G06K 9/00657; G06K 9/00885; G06K 9/6272; G06K 9/6223; A01G 2/00;
(Continued)

(56) References Cited

U.S. PATENT DOCUMENTS 5,253,302 A 10/1993 Massen
10,008,035 B1 * 6/2018 Redden .................. G06T 7/337
(Continued)

OTHER PUBLICATIONS

Zermas et al., "Extracting Phenotypic Characteristics of Corn Crops Through the Use of Reconstructed 3D Models," 2018 IEEE/RSJ International Conference on Intelligent Robots and Systems (IROS), Oct. 2018, 8 pp.

(Continued)

*Primary Examiner* — Solomon G Bezuayehu
(74) *Attorney, Agent, or Firm* — Shumaker & Sieffert, P.A.

(57) ABSTRACT

Systems, techniques, and devices for detecting plant biometrics, for example, plants in a crop field. An imaging device of an unmanned vehicle may be used to generate a plurality of images of the plants, and the plurality of images may be used to generate a 3D model of the plants. The 3D model may define locations and orientations of leaves and stems of plants. The 3D model may be used to determine at least one biometric parameter of at least one plant in the crop. Such detection of plant biometrics may facilitate the automation of crop monitoring and treatment.

19 Claims, 14 Drawing Sheets

(51) Int. Cl.
  *G06T 7/00* (2017.01)
  *B64D 47/08* (2006.01)
  *B64C 39/02* (2006.01)
  *A01G 2/00* (2018.01)
  *G06Q 50/02* (2012.01)
  *A01G 7/00* (2006.01)

(52) U.S. Cl.
  CPC ........... *G06Q 50/02* (2013.01); *G06T 7/0012* (2013.01); *G06T 17/00* (2013.01); *A01G 7/00* (2013.01); *B64C 2201/127* (2013.01); *G06K 9/00885* (2013.01); *G06T 2200/04* (2013.01); *G06T 2207/10028* (2013.01); *G06T 2207/10032* (2013.01); *G06T 2207/30188* (2013.01)

(58) Field of Classification Search
  CPC .......... A01G 7/00; G06Q 50/02; G06T 17/00; G06T 7/0012; G06T 2200/04; G06T 2207/10028; G06T 2207/10032; G06T 2207/30188; G06T 17/10; G06T 7/62; B64D 47/08; B64C 39/024; B64C 2201/127; B64C 2201/123
  See application file for complete search history.

(56) References Cited

U.S. PATENT DOCUMENTS

| | | | |
|---|---|---|---|
| 2002/0169735 A1* | 11/2002 | Kil | G06F 16/2465 706/46 |
| 2005/0243323 A1 | 11/2005 | Hsu et al. | |
| 2008/0231633 A1 | 9/2008 | Keller et al. | |
| 2008/0304710 A1* | 12/2008 | Xu | G06K 9/342 382/110 |
| 2009/0103773 A1 | 4/2009 | Wheeler et al. | |
| 2009/0210205 A1* | 8/2009 | Sullivan | G06T 17/05 703/6 |
| 2011/0141227 A1 | 6/2011 | Bigioi et al. | |
| 2013/0060775 A1* | 3/2013 | Qiu | G16B 40/30 707/737 |
| 2013/0169478 A1* | 7/2013 | Vourc'h | G01S 19/49 342/357.58 |
| 2013/0287369 A1* | 10/2013 | Geyzel | G06T 1/0028 386/252 |
| 2014/0009568 A1* | 1/2014 | Stec | G06T 5/006 348/36 |
| 2014/0125663 A1* | 5/2014 | Zhang | G06T 7/155 345/420 |
| 2015/0015697 A1 | 1/2015 | Redden et al. | |
| 2015/0379350 A1 | 12/2015 | Li et al. | |
| 2016/0094744 A1* | 3/2016 | Yamamoto | B26D 5/005 358/3.31 |
| 2017/0154463 A1 | 6/2017 | Von Cramon | |
| 2017/0206415 A1* | 7/2017 | Redden | G06T 7/593 |
| 2017/0372137 A1 | 12/2017 | Kumar et al. | |
| 2018/0051295 A1 | 2/2018 | Allen et al. | |
| 2018/0143172 A1 | 5/2018 | Mcpeek | |
| 2018/0184073 A1* | 6/2018 | Burgess | B64C 39/024 |
| 2018/0259496 A1* | 9/2018 | McPeek | G01N 33/025 |
| 2018/0313760 A1 | 11/2018 | Kramer et al. | |
| 2018/0332480 A1* | 11/2018 | Pang | H04W 16/18 |
| 2019/0029201 A1 | 1/2019 | Griffin | |
| 2019/0108639 A1 | 4/2019 | Tchapmi et al. | |
| 2019/0128864 A1 | 5/2019 | Pickett et al. | |
| 2019/0147302 A1* | 5/2019 | Jampani | G06K 9/6277 382/156 |
| 2019/0221033 A1* | 7/2019 | Messerlie | G06T 7/62 |
| 2019/0274257 A1 | 9/2019 | Papanikolopoulos et al. | |
| 2020/0066034 A1* | 2/2020 | Tham | G06T 7/579 |
| 2020/0193614 A1* | 6/2020 | Tadi | G06N 5/003 |

OTHER PUBLICATIONS

Zermas, "Combining Machine Learning with Computer Vision for Precision Agriculture Applications," Doctor of Philosophy Thesis for University of Minnesota, Apr. 2018, 106 pp.
Office Action from U.S. Appl. No. 16/296,856, dated Nov. 9, 2020, 10 pp.
Response to Office Action dated Nov. 9, 2020, from U.S. Appl. No. 16/296,856, filed Mar. 8, 2021, 13 pp.
Office Action from U.S. Appl. No. 16/296,856, dated Mar. 30, 2021, 5 pp.
Notice of Allowance from U.S. Appl. No. 16/296,856, dated Jul. 15, 2021, 7 pp.
Corrected Notice of Allowance from U.S. Appl. No. 16/296,856, dated Jul. 21, 2021, 4 pp.
Response to Office Action dated Mar. 30, 2021, from U.S. Appl. No. 16/296,856, filed Jun. 25, 2021, 10 pp.

\* cited by examiner

CROP MODELS AND BIOMETRICS

This application claims the benefit of U.S. Provisional Patent Application Nos. 62/640,455, filed Mar. 8, 2018 and 62/640,447, filed Mar. 8, 2018, the entire content of each being incorporated herein by reference.

GOVERNMENT RIGHTS

This invention was made with government support under CNS-1439728, IIS-1427014, and CNS-1531330 awarded by National Science Foundation. The government has certain rights in the invention.

TECHNICAL FIELD

This disclosure relates to systems and techniques for detecting crop biometrics.

BACKGROUND

Crops such as corn are produced on significantly large scales. Deficiencies during the cultivation process may impact the ultimate quality of crops. Early detection and treatment of crop deficiencies and periodic evaluation of the status of growth may assist with managing crop quality. For example, plant biometrics information may be useful in assessing plant health and crop status. Invasive techniques for estimating plant biometrics may require the destruction of plants being analyzed. Noninvasive techniques may rely on sparse or random physical measurements that may be manually intensive and not be sufficiently fine-grained or accurate.

SUMMARY

The disclosure describes systems, techniques, and devices for detecting crop biometrics.

In some examples, an example system for detecting crop biometrics includes an unmanned vehicle including at least one imaging device. The system includes a crop modeling device communicatively coupled to the imaging device. The crop modeling device includes a processor configured to receive, from the imaging device, a plurality of images of a crop of plants in a field. The processor is configured to generate, based on the plurality of images, a three-dimensional (3D) model of the plants. The 3D model defines locations and orientations of leaves and stems of the plants. The processor is configured to determine, based on the 3D model, at least one biometric parameter of at least one plant in the crop.

In some examples, an example technique for detecting crop biometrics includes receiving, by a processor, from an imaging device of an unmanned vehicle, a plurality of images of a crop of plants in a field. The technique includes generating, by the processor, based on the plurality of images, a three-dimensional (3D) model of the plants. The 3D model defines locations and orientations of leaves and stems of the plants. The technique includes determining, by the processor, based on the 3D model, at least one biometric parameter of at least one plant in the crop.

In some examples, an example crop modeling device includes a processor and a non-transitory computer readable storage medium. The storage medium includes instructions, that when executed, cause the processor to: receive, from an imaging device of an unmanned vehicle, a plurality of images of a crop of plants in a field. The instructions, when executed, cause the processor to generate, based on the plurality of images, a three-dimensional (3D) model of the plants. The 3D model defines locations and orientations of leaves and stems of the plants. The instructions, when executed, cause the processor to determine, based on the 3D model, at least one biometric parameter of at least one plant in the crop.

The 3D models of the plants and the crop provides an alternative to existing cumbersome biometric estimation methodologies. The use of 3D models may provide an elevated information content, when compared to planar methods. For example, 3D point clouds may be generated based on high resolution images of plant (for example, corn stalks), and used to obtain 3D models. The 3D models may be used to determine one or more plant biometrics. Plant biometrics detection according to the present disclosure may be useful for a better understanding of the needs of not only to the farm or crop as a whole, but also for individual plants, providing a higher granularity for potential treatment strategies.

The details of one or more examples are set forth in the accompanying drawings and the description below. Other features, objects, and advantages will be apparent from the description and drawings, and from the claims.

DETAILED DESCRIPTION

The disclosure describes example systems, techniques, and devices for detecting crop biometrics. In some examples, crop biometrics as described herein may refer to plant phenotyping.

Figure 1:
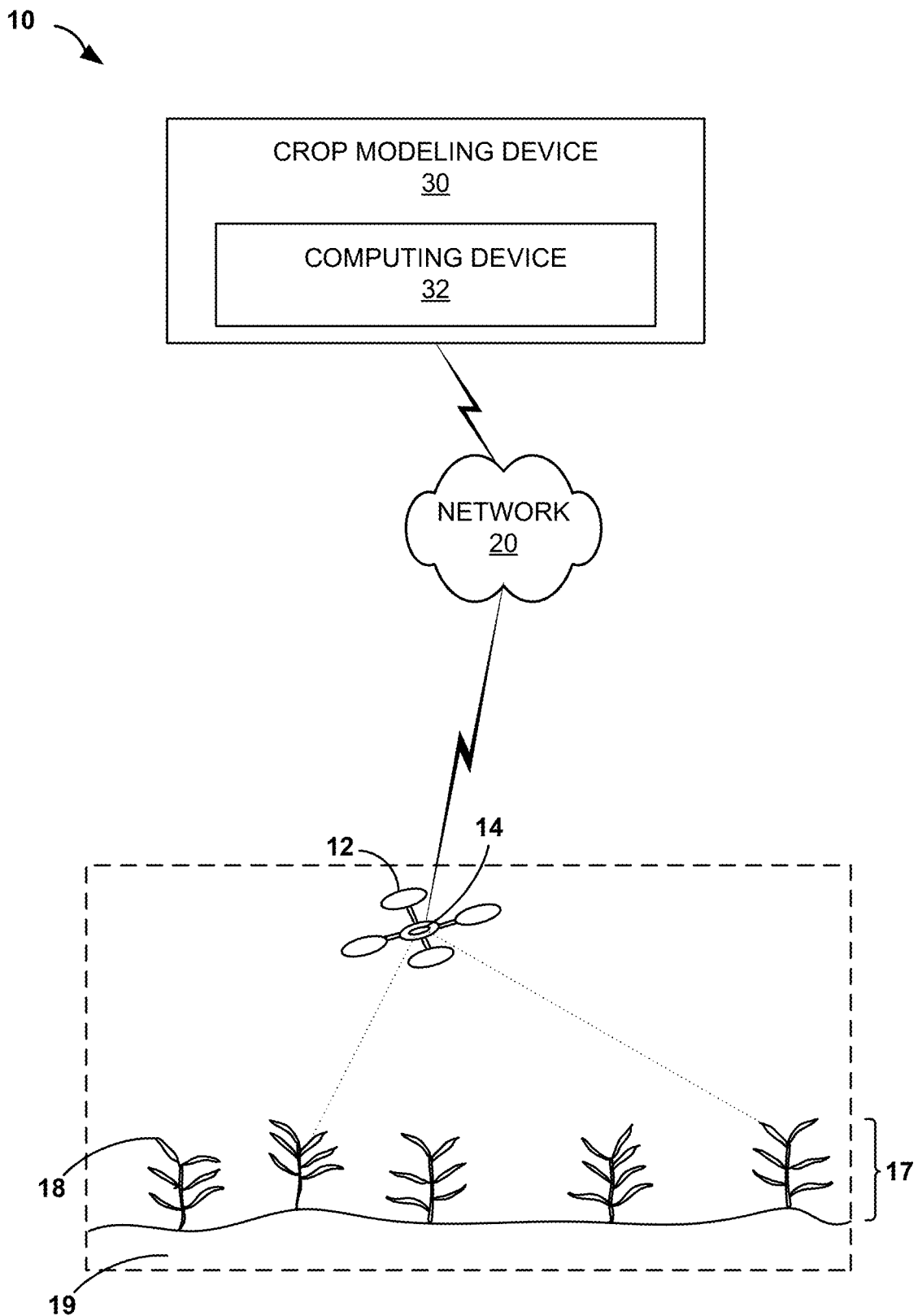
FIG. 1 is a conceptual and schematic diagram of a system including an unmanned vehicle and a crop modeling device for imaging crops in a field.

FIG. 1 is a conceptual and schematic diagram of a system 10 including an unmanned vehicle 12 and a crop modeling device 30 for imaging crops 17 in a field 19. Crops 17 may include a plurality of plants 18. Plurality of plants 18 may include plants of the same species or variety, or different plants. For example, crops 17 may include corn, soy, wheat, rice, or any other predetermined crop plants. In some examples, plurality of plants 18 includes corn. For example, the corn may be in any predetermined stage of growth. In some examples, the corn may be in a stage of growth including "V3" through "V8", based on the V-numbering system used to define corn growth stages.

Unmanned vehicle 12 may include at least one imaging device 14 for imaging crops 17, plurality of plants 18, or field 19. For example, imaging device 14 may image individual plants of plurality of plants 18 or portions or regions of individual plants, or may image more than one plant and its surrounding environment (for example, soil), or a portion or region of crops 17 or of field 19. Imaging device 14 may include a charge coupled device (CCD) sensor, a complementary metal oxide semiconductor (CMOS sensor), an infra-red sensor, an ultraviolet sensor, a visible light sensor, or any other suitable imaging sensor. Imaging device 14 may capture individual images, or a burst of images, a predetermined temporal sequence of images, or capture a continuous video from which images may be retrieved. While a single imaging device 14 is shown in FIG. 1, in other examples, unmanned vehicle 12 may include a plurality of imaging devices 14. In some examples, imaging device 14 may include a memory (not shown) to store images. In some examples, imaging device 14 may be communicatively coupled to a network 20 by wired or wireless communication media, and images captured by imaging device 14 may be ultimately stored on network 20, or in a storage of crop modeling device 30 or a computing device 32.

Unmanned vehicle 12 may include any vehicle on which imaging device 14 may be mounted or secured, and which may move between, over, about, around, under, along, or across, crops 17, plants 18, or field 19. In some example, unmanned vehicle 12 may move along a predetermined path under manual or automatic control, and imaging device 14 may capture a plurality of images as unmanned vehicle 12 moves along the predetermined path. In some examples, unmanned vehicle 12 may include a bracket (not shown) for mounting imaging device 14. In some examples, the bracket is fixed, in which chase unmanned vehicle may translate or rotate to change the field of view of imaging device 14. In other examples, the bracket may be movable, and the bracket may translate or rotate to change the field of view of imaging device 14. In some examples, unmanned vehicle 12 includes an unmanned aerial vehicle, for example, a fixed wing or a rotary drone. In the example shown in FIG. 1, system 10 includes a 4-winged rotary drone. In other examples, unmanned vehicle 12 includes an unmanned ground vehicle, for example, a ground robot, or self-driving car. While various examples according to the disclosure are described with reference to unmanned vehicle 12, in some examples, imaging device 14 may be mounted or secured to a manned vehicle or structure, and the manned vehicle or structure may travel along a predetermined path, for example, under direct or indirect manual control or supervision. Thus, the plurality of images may include images taken at different locations and different orientations along field 19 or adjacent to field 19. In some examples, the plurality of images includes images taken at different locations and different orientations along a substantially circular predetermined path about field 19.

In some examples, crop modeling device 30 is communicatively coupled to imaging device 14. For example, crop modeling device 30 may be coupled to imaging device 14 through network 20, or any suitable wired or wireless connection. While crop modeling device 30 is shown distinct and separate from unmanned vehicle 12 in example system 10 shown in FIG. 1, in other examples, unmanned vehicle 12 may include crop modeling device 30. For example, crop modeling device 30 may be housed within a housing of unmanned vehicle 12 or may be housed within a housing mounted on or secured to unmanned vehicle 12. The function of crop modeling device 30 is described with reference to FIGS. 1 and 2.

Figure 2:
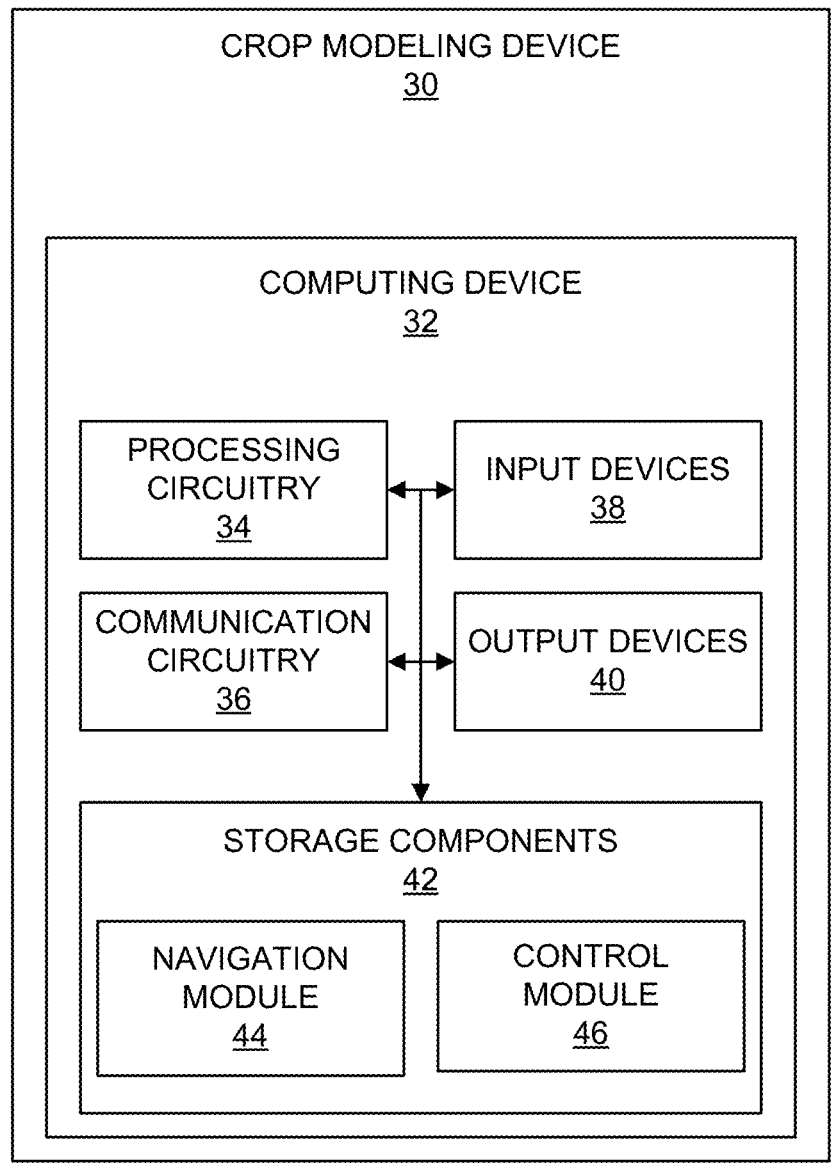
FIG. 2 is a conceptual and schematic diagram of the crop modeling device of FIG. 1.

FIG. 2 is a conceptual and schematic diagram of crop modeling device 30 of FIG. 1.

Crop modeling device 30 receives images captured by imaging device 14, and may ultimately generate a three-dimensional (3D) model of the crops 17, of plants 18, or of field 19, based on the plurality of images. In some examples, the 3D model defines locations and orientations of leaves and stems of plants 18. Crop modeling device 30 may further determine at least one biometric parameter, for example, plant height, leaf count, or another predetermined biometric parameter, of at least one plant, for example, individual plants of crops 17, or of aggregate plants 18 in field 19. Crop modeling device 30 may include a computing device 32 that processes the plurality of images. In some examples, system 10 of FIG. 1 may not include a separate crop modeling device 30, and functions described with reference to crop modeling device 30 or computing device 32 may be performed by unmanned vehicle 12. For example, unmanned vehicle 12 itself may optionally include computing device 32.

Computing device 32 includes processing circuitry 34 (also referred to as a processor), coupled to one or more of one or more communication circuitry 36, one or more input devices 38, one or more output devices 40, or one or more storage components 42. Processing circuitry 34 may include more than one processor. Examples of processing circuitry 34 may include, any one or more of a microprocessor, a controller, a digital signal processor (DSP), an application specific integrated circuit (ASIC), a field-programmable gate array (FPGA), or equivalent discrete or integrated logic circuitry.

Communication circuitry 36 may include a network interface card, such as an Ethernet card, an optical transceiver, a radio frequency transceiver, or any other type of device that can send and receive information. Other examples of such network interfaces may include WiFi radios or Universal Serial Bus (USB). In some examples, crop modeling device 30 utilizes communication circuitry 36 to wirelessly communicate with an external device such as unmanned vehicle 12 or imaging device 14.

Input devices 38, in some examples, are configured to receive input from a user through tactile, audio, or video sources. Examples of input devices 38 include a mouse, a keyboard, a voice responsive system, video camera, microphone, touchscreen, a control panel including one or more switches, knobs, or potentiometers, or any other type of device for detecting a command from a user.

Output devices 40, in some examples, are configured to provide output to a user using audio or video media. For example, output devices 40 may include a display, a sound card, a video graphics adapter card, or any other type of device for converting an output signal into an appropriate form understandable to humans or machines. In some examples, output device 40 may include a display configured to display a representation of crop 17, plants 18, field 19, or a point cloud reconstruction or 3D thereof, or of one or more plant biometrics associated with respective plants.

Storage components 42 may include at least one non-transitory computer storage medium that may store instructions, and the processor may execute the instructions to perform predetermined tasks. The same storage medium or different storage medium of storage components 42 may also store the plurality of images, and the 3D model generated based on the plurality of images.

In some examples, storage components 42 may optionally include a navigation module 44 that may store instructions to guide the navigation of unmanned vehicle 12. For example, navigation module 44 may guide the movement of unmanned vehicle 12 along a predetermined path to image predetermined portions or regions of crop 17, plants 18, or field 19. In some examples, storage components 42 may optionally include a control module 46 to control the propulsion or movement of unmanned vehicle 12, for example, in conjunction with navigation module 44, or based on instructions from processing circuitry 34. For example, processing circuitry 34 may send instructions to control module 46 to cause unmanned vehicle 12 to trigger imaging of imaging device 14 to capture images at predetermined times or intervals along a path of unmanned vehicle 12.

Example techniques according to the disclosure are described with reference to system 10 and crop modeling device 30. However, example techniques can be performed by any suitable system or detection or computing device.

Figure 3:
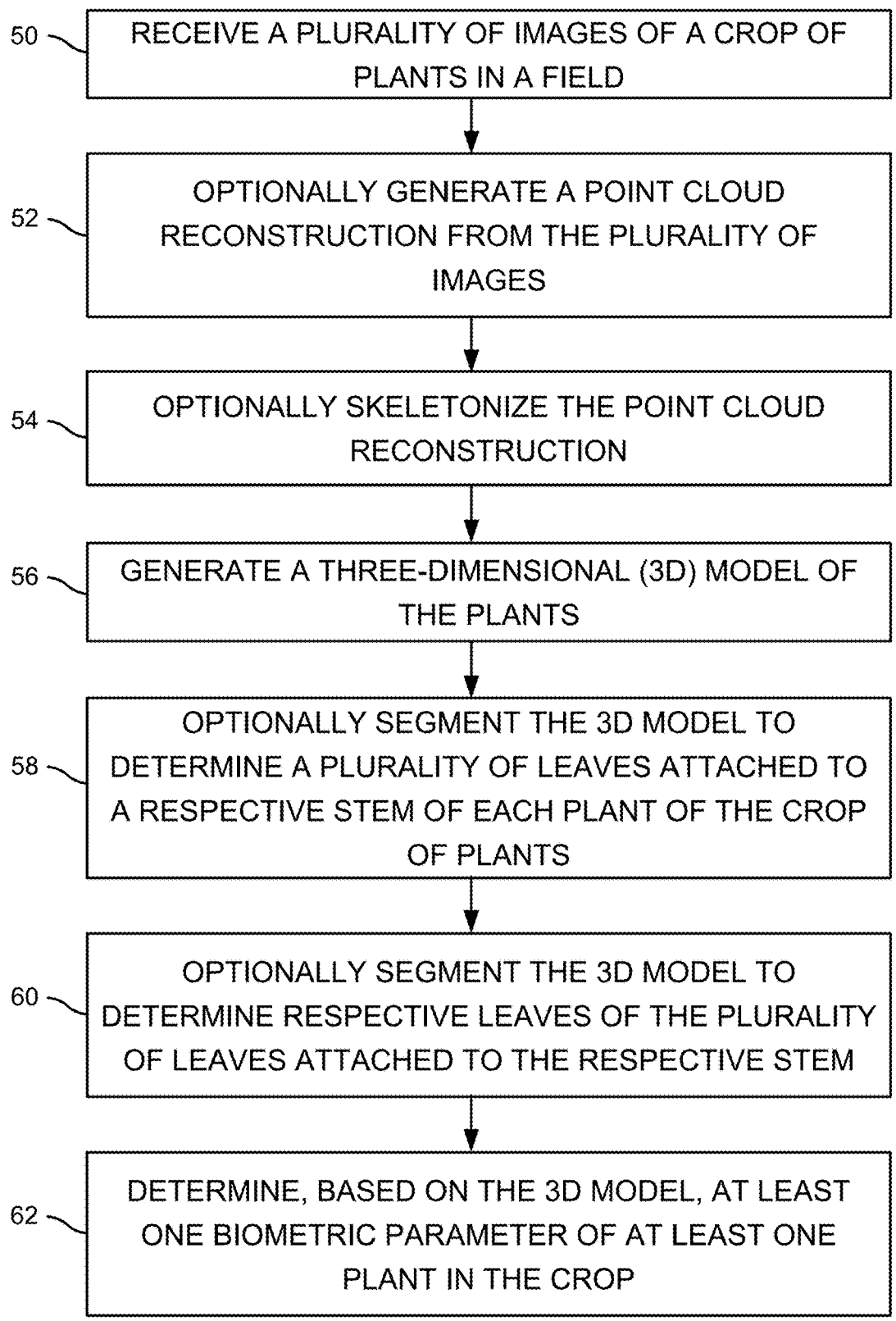
FIG. 3 is a flow diagram of an example technique for detecting crop biometrics.

FIG. 3 is a flow diagram of an example technique for detecting crop biometrics. In some examples, the example technique includes, receiving, by processing circuitry 34, from imaging device 14 of unmanned vehicle 12, a plurality of images of crop 17 of plants 18 in field 19 (50). Processing circuitry 34 may receive the plurality of images relatively immediately after they are captured by imaging device 14, for example, via network 20. In some examples, processing circuitry 34 may receive the plurality of images after a predetermined delay, or after any suitable period of time at which the plurality of images is captured, for example, from a storage medium in which the plurality of images captured by imaging device 14 are stored.

The example technique may optionally include generating, by processor circuitry 34, based on the images, a point cloud reconstruction of plants 18 (52). For example, each point of the point cloud reconstruction may be represented by three spatial dimensions, and three chromatic dimensions, representing chromatic values associated with spatial dimensions. In some examples, chromatic values indicative of a green or greenish hue may indicate the presence of a portion of a plant at a particular spatial location, while chromatic values indicative of a brown or brownish hue may be indicative of soil. In some examples, processor 34 may use any known "structure-from-motion" technique to generate the point cloud representation from the plurality of images. For example, the plurality of images may include images of the same, adjacent, or overlapping regions of field 19 captured from different orientations and distances, and the "structure-from-motion" technique may generate a point cloud reconstruction based on the captured images. However, the point cloud reconstruction may include a relatively irregular distribution of points, for example, a relatively dense distribution of points in regions of which relatively many images are captured, and a relatively sparse distribution of points in regions of which relatively few images are captured. Processing circuitry 34 may therefore further process the point cloud reconstruction.

For example, the example technique may optionally include skeletonizing, by the processor, the reconstruction to reduce the number of points in the point cloud reconstruction (54). In some examples, the skeletonizing (54) may including replacing a relatively dense cluster of points with a reduced number of points, for example, a single point, representing the cluster. In some examples, the single point may be located at an average of the locations of points within the cluster, or any suitable statistical representation of the cluster of points. In some examples, the skeletonizing

(54) may include generating two-dimensional (2D) orthogonal slices of the point cloud reconstruction, generating reduced points in each 2D slice, and combining the reduced points into a skeletonized reconstruction.

The example technique includes generating, by processing circuitry 34, based on the plurality of images, a three-dimensional (3D) model of the plants (56). The processing circuitry 34 may generate the 3D model from the optional point cloud reconstruction, or otherwise indirectly or directly based on the plurality of images. The 3D model may define locations and orientations of leaves and stems of plants 18. In some examples, the 3D model includes a plurality of labels, each respective label of the plurality of labels associated with a respective element of the 3D model. Each label may define the respective element of the 3D model as being part of a stems, a leaf, or soil. For example, processing circuitry 34 may label an element associated with a green or greenish hue as being a stem or a leaf, and may label an element associated with a brown or brownish hue as being soil.

The example technique of FIG. 3 may optionally include further processing the 3D model. For example, when the 3D model is first developed, the model may only identify elements as being soil or plant, and further processing may be needed to determine whether a portion of a plant belongs to a leaf or a stem. In some examples, the example technique of FIG. 3 optionally further includes, by processing circuitry 34, segmenting the 3D model to determine a plurality of leaves attached to a respective stem of each plant 18 of the crop 17 (58). For example, a RAndomly Intercepted Nodes (RAIN) algorithm may be used to determine leaves associated with respective stems. In some examples, processing circuitry 34 may follow a path from one end of a stem to another end of a stem, and determine leaves joined to the stem along that path, or may determine leaf-node stems along the path, to determine a plurality of leaves associated with a particular stem.

In some examples, the 3D model may include occluding or overlapping leaves, such that in an initial form, the 3D model may represent multiple leaves as being a single leaf. In some such examples, the example technique may optionally include further segmenting, by processing circuitry 34, the 3D model to determine respective leaves of the plurality of leaves attached to the respective stem (60). For example, processing circuitry 34 may determine end points and intersecting nodes in the representation of leaves in the 3D model, and may determine overlapping, occluding, or intersecting leaves based on the locations and distributions of the end points and intersecting nodes.

The 3D model may be used to determine one or more biometric parameters associated with crop 17 as a whole or one or more plants 18. For example, the example technique of FIG. 3 may include determining, by processing circuitry 34, based on the 3D model, at least one biometric parameter of at least one plant 18 in crop 17 (62). The technique may further include displaying a representation of one or both of the 3D model or the biometric parameter. For example, the biometric parameter may be represented by a numeric or alphanumeric representation, or a graphical icon, or a colored representation or icon, overlaid on the 3D model. For example, biometric parameters associated with a respective plant of plants 18 or a respective portion of the plant may be overlaid on a display of the 3D model adjacent the respective plant or portion of the plant.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

A series of tests were performed to evaluate aspects of the present disclosure. The tests and associated discussion in Section 4 below illustrate aspects of some examples of the disclosure but do not limit the scope.

Section 4—3D Segmentation of Corn Plants

There was a believed need for accurate and frequent plant biometrics estimation. An accurate model of the canopy can reveal important information regarding the state of crops and provide feedback to growth models. For agricultural applications, measurements such as the biomass or the angle of the leaves with respect to the stem may be powerful indicators connected to the crops' health, growth state, and ability to photosynthesize efficiently.

In contrast to some invasive methods for accurate biomass calculation that rely on plant deconstruction, non-invasive alternatives are preferred in some instances, e.g., in commercial applications since they leave the crops intact. Such non-invasive alternatives may approximate the real biometrics based on mathematical models and sparse measurements collected randomly throughout the field. Such approaches may be inherently problematic since the average of several measurements provides a single result that characterizes a wide area. The spatial sparsity in combination with the use of cumbersome sensors which are handled by a human may impose significant constrains in the sampling process; collecting measurements for a large number of points over the field can be prohibitive, costly and inaccurate.

An automated methodology for providing detailed and reliable information from 3D models of corn canopies may directly address the needs of both researchers and companies interested in corn development. The following discussion proposes a methodology capable of estimating the biometrics of a group of plants using their 3D models. The following sections explore a pipeline that may be able to consume 3D reconstructions of crops in the field and provide measurements with a granularity and frequency that have not been available to the agriculture community before.

Figure 4:
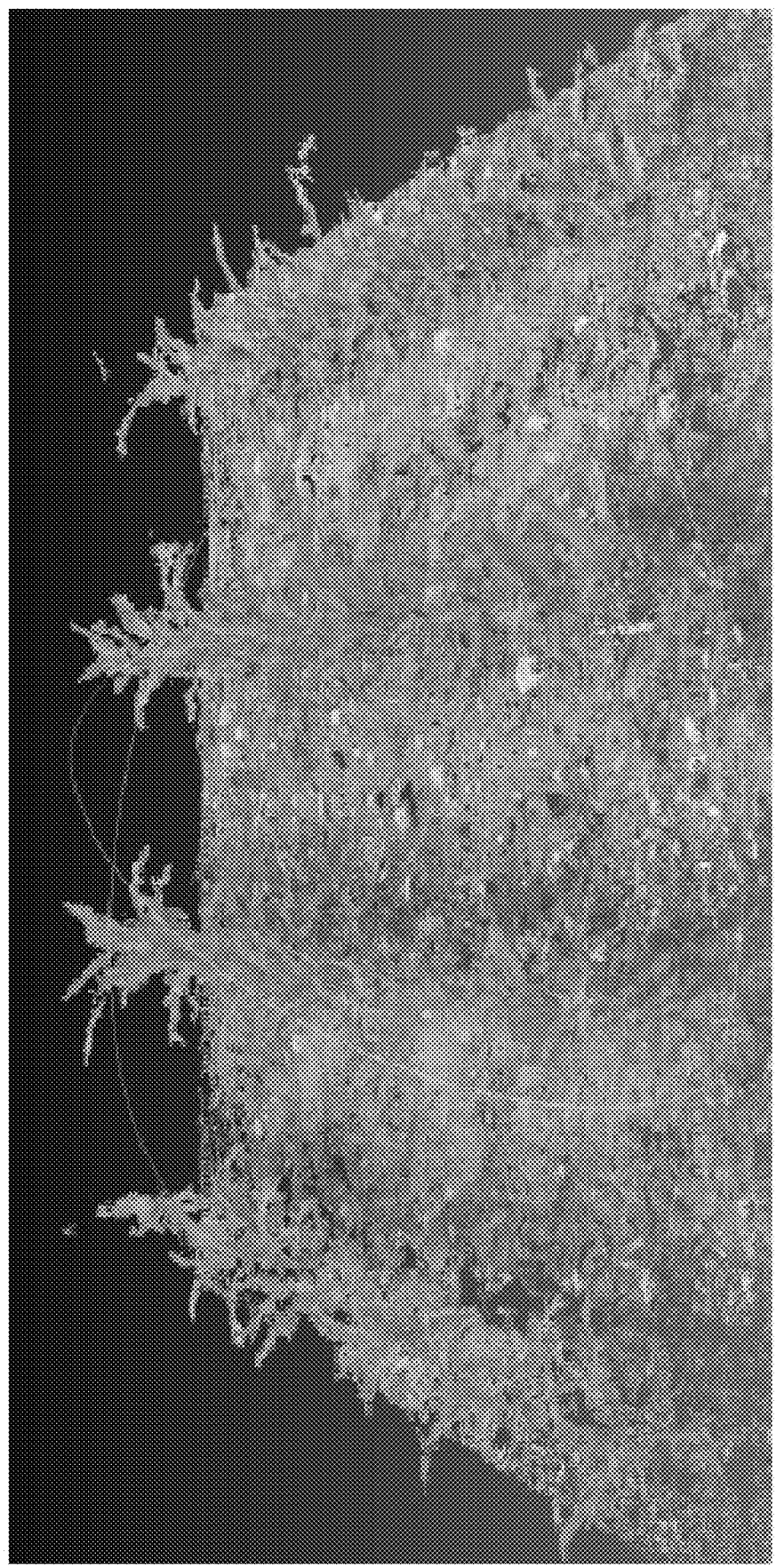
FIG. 4 is an example of a 3D model reconstructed by imagery. A four row segment of corn plants at "V5" growth stage.

When a 3D model such as that shown in FIG. 4 is accessible, the surface of all of its leaves should be observable, overcoming the leaf occlusions and resulting in a more accurate volumetric information about the plant. In some examples of the disclosure, the proposed methodology may focus on maize of growth stages between "V3" and "V8", when the plants are still susceptible to treatment and introduces the first attempt for a low-cost, mobile, and easily deployable solution for automated computation of the plant's biometrics.

4.1 Methodology

Figure 5:
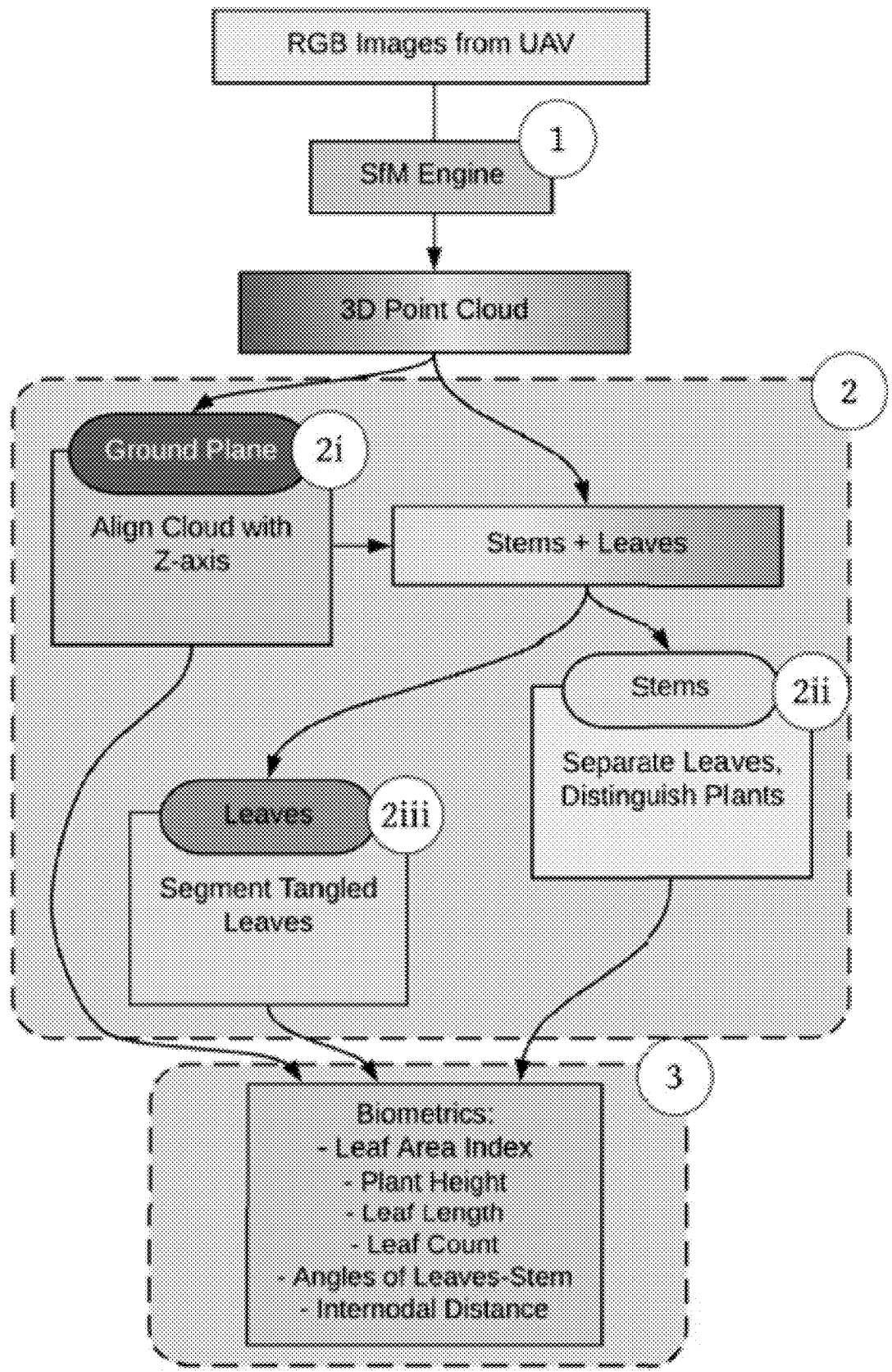
FIG. 5 is a diagram that visualizes the proposed pipeline for the segmentation and biometrics extraction from a set of images acquired by a camera mounted on a UAV.

This section provides an introduction to the basic framework used in this analysis and enumerates the main steps of the pipeline for the manipulation of the 3D reconstructions and the extraction of the biometrics. Following the diagram illustrated in FIG. 5, the pipeline may be subdivided in three main steps: Step 1. the 3D reconstruction that uses a Structure from Motion (SfM) software to transform the high resolution images to a 3D model; Step 2. the segmentation step that assigns labels to the parts of the 3D reconstruction and more specifically (2.i) the ground, (2.ii) the stems, and (2.iii) the individual leaves, and Step 3. the computation of the biometrics that takes advantage of the segmentation step to combine the geometries of stems and leaves and extract measurements and statistics.

Figure 6:
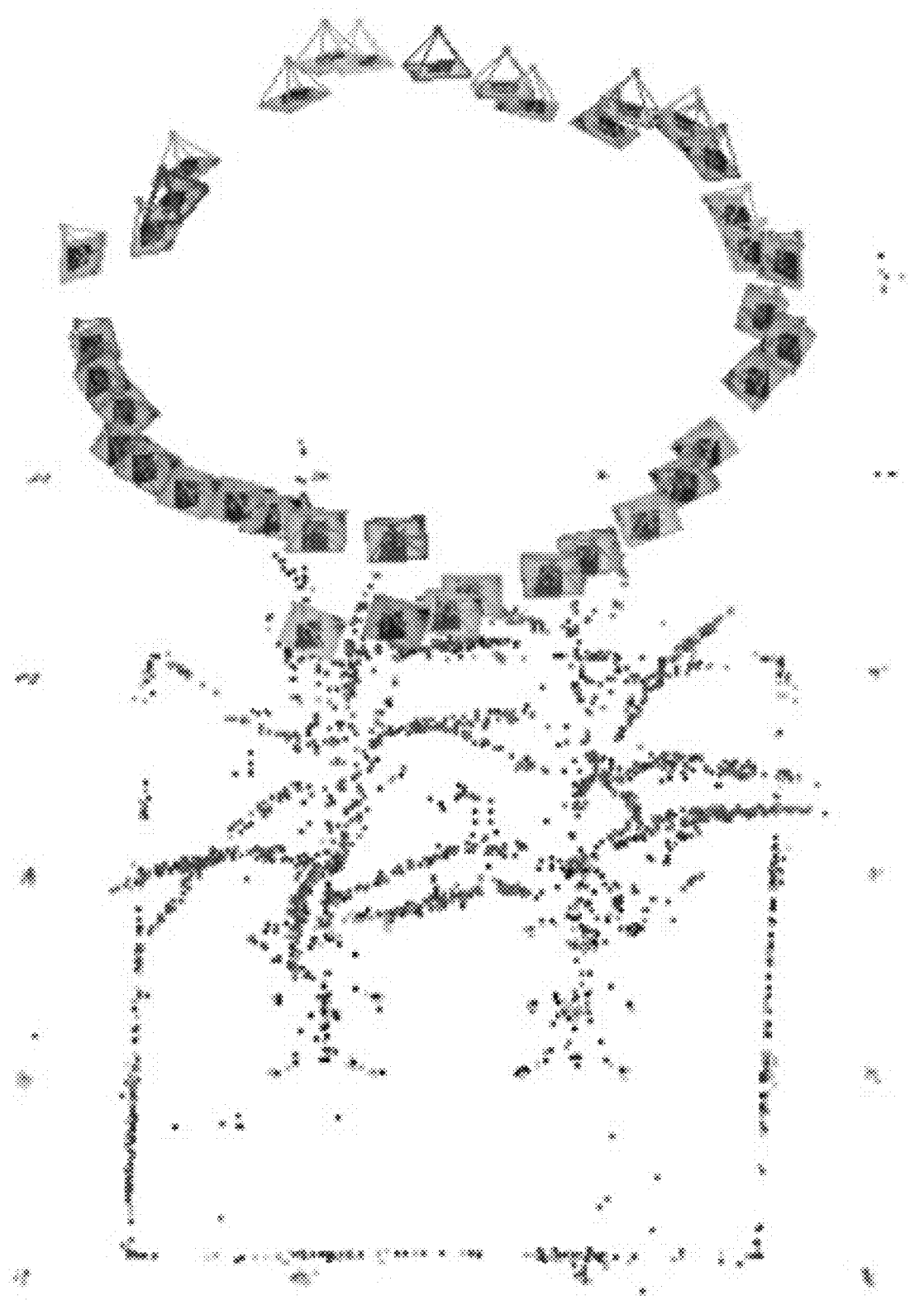
FIG. 6 is a sparse reconstruction resulting from VisualSFM software. In the non-limiting example, several high resolution images were taken using a handheld camera while moving in a circular fashion around six artificial corn stalks.

The core methodology for the segmentation as presented in this discussion requires a dense 3D reconstruction of a group of plants. This can be obtained by capturing high resolution images of the targeted group while moving in a circular fashion as seen in FIG. 6 and employing a 3D reconstruction toolbox. Obtaining the 3D reconstruction is decoupled from its processing and does not impose any platform constraints—it may only require an RGB sensor and sufficient computation capabilities. It is possible to acquire the necessary imagery through handheld or UAV mounted cameras.

The extracted 3D reconstruction has the form of a collection of points, known as a point cloud, P. Each point p of the point cloud has a physical representation in 3D space and is expressed by a vector of three values along the x, y, and z axis. Associated with each p are three more values that reflect the r, g, and b chromas of the red, green, and blue channels. Consecutively, each point can be represented as:

$$p=[x,y,z,r,g,b]. \quad (4.1)$$

The complexity of the outdoor crop field is apparent in the obtained 3D object 4.1 and requires an initial segmentation step able to separate the scene into the main components. Three main semantic categories may be defined that are used as building blocks for any biometric extraction; the soil, the stems, and the leaves. The soil represents the background and usually takes a significant portion of the generated 3D model. It may be useful for the separation between plants and facilitates the alignment of the point cloud along the z-axis. The stem is the skeleton of each plant, holds information on the number of plants, their row spacing and height, and it is the connecting element between all the leaves of the same plant. Finally, the leaves are the main semantic elements of our analysis since they comprise the majority of the biomass of a plant and reveal its ability to photosynthesize.

The subsequent sections present the dataset that was used for the testing and validation, as well as the algorithms that constitute the segmentation pipeline.

4.2 Preprocessing

Each time a 3D reconstruction is provided, a series of steps transform it into an input that is compatible to the manipulation pipeline. These transformations attempt to alleviate the inherent shortcomings of the SfM.

4.2.1 Scaling

The 3D reconstruction resulting from an SfM algorithm is up-to-scale equivalent to the actual scene, which means that any geometric computations performed on the reconstructed scene are not directly comparable to real world measurements. Furthermore, this discrepancy is different for every 3D reconstruction forcing the selection of different algorithmic constants at each execution. One solution in determining the scaling factor s of the reconstruction in order to correct the geometric inconsistencies and verify the correctness of our computations is to compare the inter-row distance of the real world corn plants $h_{real}$ against the inter-row distance of the reconstructed corn plants $h_{reconstructed}$. This scaling ratio is applied to the whole point cloud and is computed as:

$$s = \frac{h_{real}}{h_{reconstructed}}. \quad (4.2)$$

Figure 7:
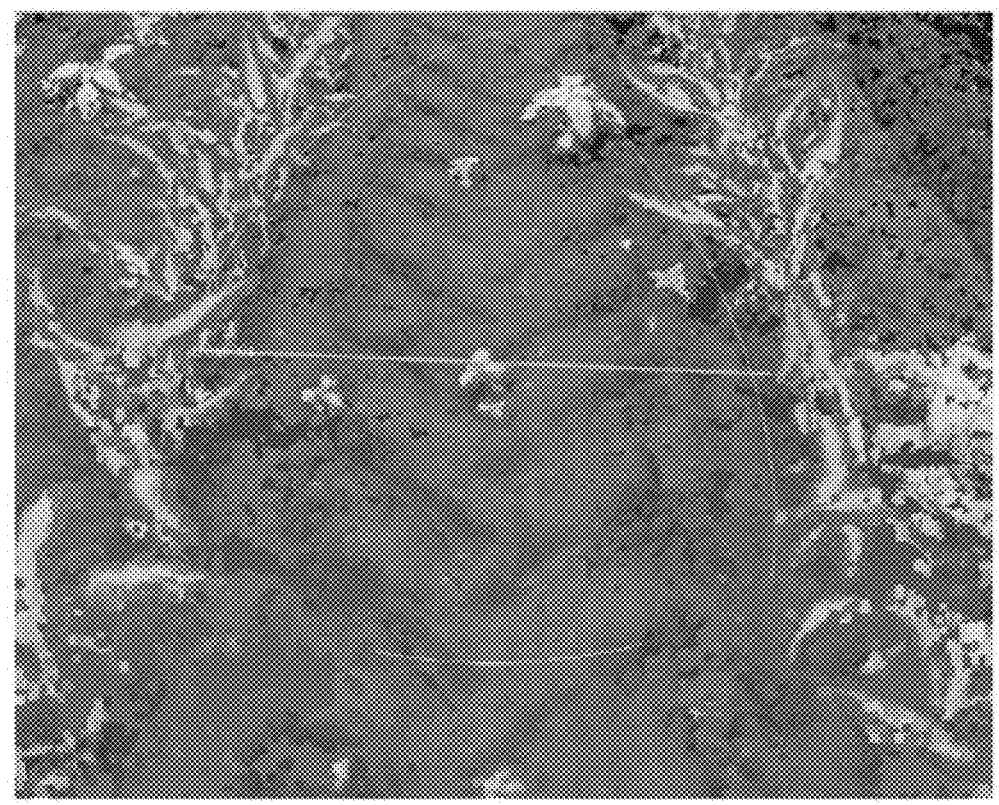
FIG. 7 is an example image of a user selecting an inter-row distance. The user is prompted to use an interactive tool such as MeshLab 1 to measure the inter-row distance of the reconstruction. An example real world distance is, e.g., 22 or 30 inches for Minnesota.

The inter-row distance was chosen as one of the most reliable constants in a field; during the planting, farmers select this distance and the tractors are configured to accurately follow it. As seen in FIG. 7, the user is prompted to measure the distance between rows with a 3D interactive tool. This interaction needs to take place for each new reconstruction.

4.2.2 Point Cloud Alignment

When the plant stems assume a position nearly perpendicular to the x-y plane and the ground is translated to match the x-y plane, several geometric priors can be utilized efficiently to reduce the complexity of the subsequent steps. That is why, after the scaling it was desired to rotate the point cloud perpendicular to the z-axis and locate its ground plane.

Initially, the color information of each point was used to perform a color clustering that separates the brown from green points using an algorithm. This step resulted into two point clouds, one holding mostly ground points $P_{gr}$ and the other mostly vegetation $P_{veg}$. This clustering step allows the undisturbed processing of ground and vegetation clouds separately and eliminates problems created by artifacts such as rocks or significant difference in elevation. The $P_{gr}$ is first processed to acquire a good estimate of the ground plane.

The points belonging to the ground plane are the majority of $P_{gr}$ and are easily detectable by a RANdom SAmple Consensus (RANSAC) designed to estimate the coefficients of a 3D plane. The core of the RANSAC algorithm for the estimation of the ground plane $P_{pl}$ utilizes the simple linear model:

$$ax+by+cz+d=0$$

$$n^T x = -d, \quad (4.3)$$

with $n=[a\ b\ c]^T$ and $x=[x\ y\ z]^T$, and solves for the normal n through the covariance matrix $C \in R^{3\times3}$ as computed by the set of plane inlier points $S \in R^3$:

$$C = \sum_{i=1:|S|} (s_i - \hat{s})(s_i - \hat{s})^T, \quad (4.4)$$

where $\hat{s} \in R^3$ is the mean of all $s_i \in S$.

The covariance matrix C captures the dispersion of the ground points and its three singular vectors that can be computed by its singular value decomposition (SVD), describe the three main directions of this dispersion. Since the plane is a flat surface, the normal n, which is perpendicular to the plane, indicates the direction with the least variance and is captured by the singular vector corresponding to the smallest singular value. After the acquisition of n, d is directly computed from Eq. 4.3 by substituting x with s which is a good representative for the points belonging to the plane.

At this stage, it is desirable to align the normal n of the ground plane with the normal of the x-y plane $k=[0\ 0\ 1]^T$. The solution is utilizing the Rodrigues' rotation formula, where the point cloud is rotated around an axis u=cross(n, k) perpendicular to both n and k by the angle between them θ=angle(n, k):

$$R = I + \sin(\theta)\lfloor u \rfloor_x + (1-\cos(\theta))\lfloor u \rfloor_x^2, \quad (4.5)$$

where $I \in R^{3\times3}$ is the identity matrix and $\lfloor u \rfloor_x$ is the skew symmetric matrix form of the vector x. The rotation matrix $R \in SO(3)$ is acting on all the points in the point cloud P and the resulting point cloud is aligned perpendicularly to the z-axis. Finally, a mean of the $P_{pl}$ is computed and subtracted from all the points in P to move the ground plane on top of the x-y plane.

Attention is required by the sign of n so that the rotation is successfully orienting the point cloud. A test is performed as a last step by checking all the z values of the points and if the majority of them is found positive the solution is accepted, otherwise the process is repeated with n=-n.

4.2.3 Noise Filtering

As in most real world data, the noise in the data was present with the form of uncertainty in the 3D measurements and 3D artifacts forming undesired artifacts (e.g. stones in the field). One step after the separation of the main point cloud P into $P_{gr}$ and $P_{veg}$, the second is treated with a custom filtering algorithm similar to DB SCAN that removes clusters of size less than a threshold n if they are located further away than a distance d from any other point cluster.

The details of this ($\mathcal{O}$ (n log n)) algorithm are seen in Algorithm 2 where a KDtree structure is selected for fast ($\mathcal{O}$ (log n)) neighboring points search, a boolean vector visited keeps track of the points that have been visited, and another boolean vector keepers stores the indices of the points that comply with the two aforementioned thresholds.

4.2.4 Skeletonization

Figure 8:
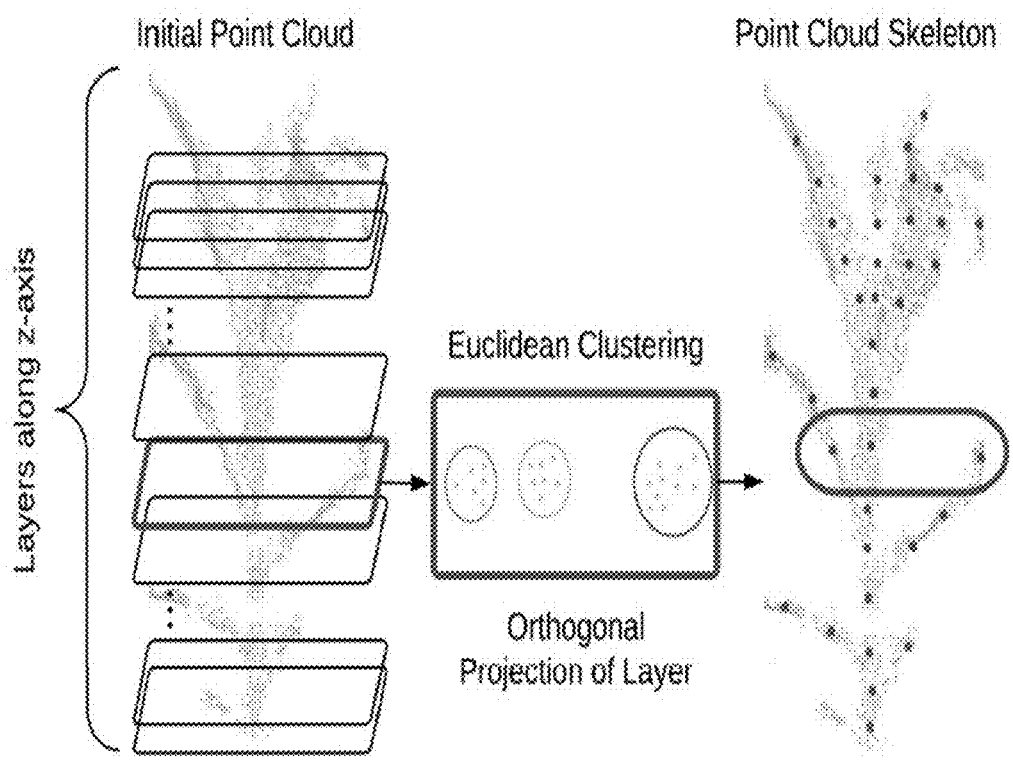
FIG. 8 is an example flow chart for an example thinning process of the 3D reconstruction of a single plant. The points are divided in layers based on their height and in each layer a Euclidean clustering algorithm performs a grouping. The centroid representatives of each group form the final thinned cloud.

The extracted 3D reconstructions usually have a few million points and the processing power required to treat those is quite high. In an effort to reduce the running-time and add robustness against noise, the $P_{veg}$ is undergoing a skeletonization step that thins out the excess points but retains the ones that express the basic topology of the plants FIG. 8.

Our custom skeletonization Algorithm 3 takes advantage of the alignment of the point cloud that was described in 4.2.2 and splits it into thin slices of height h along the z-axis. Each slice now contains k points of similar height z that are spread across the x-y plane and the goal is to perform a per-slice clustering to find points that best represent the rest. The clustering creates at least one cluster Cl at each slice and is performed utilizing a Euclidean Clustering technique ($\mathcal{O}$ (n log n)) described by Rusu and the only parameter needed is a radius r defining a sphere for the 3D space search. The complexity of this algorithm is mainly the Euclidean Clustering that is repeated k times, once for each slice, complemented by the computation of the cluster average to extract the representing point. This brings the total complexity to $\mathcal{O}$ (mk log k) with m being the number of clusters found in a slice. An important element of this algorithm is the ability to associate points with their representatives and this is achieved by an index vector associationIndex that stores the representative for each point.

---

Algorithm 2: Filtering algorithm for the removal of noisy points and artifacts.

| | |
|---|---|
| | Result: ptsFiltered = set of points surviving the filtering |
| 1 | Initialization: |
| 2 | kdtree = createKDtree($P_{veg}$) |
| 3 | N = $\|P_{veg}\|$ |
| 4 | keepers = False(1 : N) |
| 5 | visited = False(1 : N) |
| 6 | Main Loop: |
| 7 | for i = 1 : N do |
| 8 |     if visited(i) then |
| 9 |        continue |
| 10 |     end |
| 11 |     pt = $P_{veg}$(i) |
| 12 |     neighborsIndex = findNeighbors(kdtree, pt, d) |
| 13 |     if \|neighborsIndex\| > n then |
| 14 |        keepers(neighborsIndex) = True |
| 15 |        visited(neighborsIndex) = True |
| 16 |     end |
| 17 |     visited(i) = True |
| 18 | end |
| 19 | ptsFiltered = $P_{veg}$(keepers) |

---

Algorithm 3: Skeletonization algorithm for the for the thinning of the vegetation point cloud.

| | |
|---|---|
| | Result: skeleton = set of points forming the skeleton |
| | Result: associationIndex = vector storing the representative of each point |
| 1 | Initialization: |
| 2 | N = $\|P_{veg}\|$ |
| 3 | counter = 1 |
| 4 | low = minimumZ($P_{veg}$) |
| 5 | high = maximumZ($P_{veg}$) |
| 6 | slices = low : high |
| 7 | associationIndex = zeros(1 : N) |
| 8 | skeleton = ∅ |
| 9 | Main Loop: |
| 10 | for i = 1 : \|slices\| - 1 do |
| 11 |     ptsIdx = ptsBetweenSlices(i, i + 1) |
| 12 |     Cl = euclideanSegmentation($P_{veg}$(ptsIdx), r) |
| 13 |     for j = 1 : \|Cl\| do |

| Algorithm 3: Skeletonization algorithm for the for the thinning of the vegetation point cloud. | | | |
|---|---|---|---|
| 14 | | | centroid = average(Cl(j)) |
| 15 | | | skeleton(counter) = centroid |
| 16 | | | associationIndex(ptsIdx(Cl(j))) = centroid |
| 17 | | | counter + + |
| 18 | | end | |
| 19 | end | | |

4.3 Stem Segmentation

Point clouds that depict crop field scenes may benefit greatly from the previously presented transformation and preprocessing schemes. The updated $P_{veg}$ point cloud is now ready to be processed and the first step towards the final segmentation goal is the extraction of the stems. The plant stems impose complexities in the separation of leaves, while on the other hand reveal helpful information regarding the position of leaves. Therefore, their detection may be both necessary and desirable. First, an original algorithm that takes advantage of the geometry of the corn plants is presented, followed its application in the detection and extraction of the plant stems.

4.3.1 Randomly Intercepted Nodes

The corn stems are mostly perpendicular to the ground but this is not always the case, especially when accounting for the amount of noise in the 3D reconstructions, the slope differences in the fields, and the occasional but quite frequent double-planting (the seeding tractor planted more than one seeds in the same location). Consecutively, any solutions that make this assumption are doomed to fail in at least one of the aforementioned cases and cannot be employed for a generalized solution.

An observation regarding the topology of the plants that always holds however, dictates that a rain drop that falls on any part of the plant has to glide on top of the plant's surface before it reaches the ground and has only two routes to achieve that; fall over the edge of a leaf, or follow the stem closely until it reaches the plant base. The core of our algorithmic approach makes use of this observation and tries to simulate the behavior of hundreds of randomly placed rain drops, were they to glide on the surface of the point cloud $P_{veg}$. The associated algorithm is called RAndomly Intercepted Nodes (RAIN) and records common routes of the randomly placed rain drops.

The RAIN is heavily utilized for the extraction of several of the proposed biometrics. By changing the thresholds, altering the conditions, and even applying it iteratively, different plant topologies are captured rendering it an inseparable tool of this pipeline. In the following paragraphs we will follow the algorithm provided in Algorithm 4 and explain its basic steps.

| Algorithm 4: The RAIN algorithm is core for the extraction of several biometrics. | | | | |
|---|---|---|---|---|
| | Result: $P_{labels}$ = vector with the labels of each visited point | | | |
| 1 | Initialization: | | | |
| 2 | $P_{veg}$ – input point cloud | | | |
| 3 | kdtree = createKDtree($P_{veg}$) | | | |
| 4 | counter = 1 | | | |
| 5 | label = 0 | | | |
| 6 | Main Loop: | | | |
| 7 | while counter < $N_{drops}$ do | | | |
| 8 |     ptIndex = randomlySelectPoint($P_{veg}$) | | | |
| 9 |     pt = $P_{veg}$(Index) | | | |
| 10 |     if pt.z < $th_{height}$ then | | | |

| Algorithm 4: The RAIN algorithm is core for the extraction of several biometrics. | | | | |
|---|---|---|---|---|
| 11 | | | continue | |
| 12 | | end | | |
| 13 | | label + + | | |
| 14 | | Line = ptIndex | | |
| 15 | | reachedEnd = False | | |
| 16 | | while !reachedEnd do | | |
| 17 | | | neighborsIndex = findNeighbors(kdtree, pt, $th_{neigh}$) | |
| 18 | | | [d, select] = max(pt.z – $P_{veg}$(neighborsIndex).z) | |
| 19 | | | if $P_{labels}$(neighborsIndex(select))! = 0 then | |
| 20 | | | | $P_{labels}$(Line) = $P_{labels}$(neighborsIndex(select)) |
| 21 | | | | Line = ∅ |
| 22 | | | | label – – |
| 23 | | | | reachedEnd = True |
| 24 | | | else if d > 0 then | |
| 25 | | | | pt = $P_{veg}$(neighborsIndex(select)) |
| 26 | | | | Line = Line ∪ neighborsIndex(select) |
| 27 | | | else if size(Line) >= minPathSize) then | |
| 28 | | | | $P_{labels}$(Line) = label |
| 29 | | | | reachedEnd = True |
| 30 | | | else | |
| 31 | | | | Line = ∅ |
| 32 | | | | reachedEnd = True |
| 33 | | | | label – – |
| 34 | | | | counter – – |
| 35 | | | end | |
| 36 | | end | | |
| 37 | | counter + + | | |
| 38 | end | | | |

The algorithm's name is a metaphor of a physical phenomenon, therefore when mentioning "rain drops" it means randomly selected points within the point cloud. The routes of these drops while moving from point to point are simply sets of the indices of the visited points and the selection of each next point in the path is subject to a few simple rules influenced by gravity. The goal is to populate a vector $P_{labels}$ associated with each one of the cloud points with values that depict the label of each point. At the end, the points with the same label in the $P_{labels}$ will belong to the same topology (stem, plant, leaf, etc.) and the points that were not visited by the algorithm (label=0) and can be discarded.

Initially, the number of randomly generated rain drops $N_{drops}$ is selected. In an example 3D reconstruction the algorithm may need to identify as many as forty plants and one thousand $N_{drops}$ are sufficient. It makes sense for the drops to start at the higher levels of the reconstruction to cover more ground and capture a larger portion of each plant, so any point generated lower than $th_{height}$ is discarded and this random pick does not count towards the total $N_{drops}$ (lines 10-12). A random drop pt with the proper starting height will be generated (line 8) and added as the first entry in a vector Line that stores all the visited points in the current path (line 14). The boolean variable reachedEnd (line 15) determines when the current path terminates and is set true when the current path reaches an already visited path or the algorithm cannot find a neighbor that is lower than the current point.

Using the newly generated drop and the precomputed kdtree, all the neighbors within a sphere with radius $th_{neigh}$ are found (line 17) and their height (z) is compared against the current point pt. The neighbor which is further below the pt is selected (select) as the next point of the path (line 18). This step can be enhanced with the computation of a derivative along the z-axis but is not necessary for the basic case. For the case of an original path that has not been visited before, the algorithm shall check if the next point is actually lower than the current point (line 24), will make the next point current (line 25), will add the next point's index in the Line vector, and will repeat the process from the while loop (line 16).

If the next point belongs to a path that has been visited before (line 19), all the previously stored points of the path will be combined with the old path bearing the same label, the label will discard this path (line 22), and the Line and reachedEnd will reset. In case the current pointpt is the last of its path (line 27), the algorithm will verify that the path has at least minPathSize points and will generate a new path with a new label (line 28). In any other case, an invalid path has reached (line 30), the path variables will reset (lines 31-34) and the algorithm will start again on line 7.

The RAIN is very efficient since out of all the randomly generated drops Ndrops, the number of original routes $N_{original}$ that need to complete the whole algorithm tend to match the number of plants $N_{plants}$ in the reconstruction ($N_{drops} \rightarrow N_{original} \cong N_{plants}$). Most of the random drops encounter an already visited point and terminate prematurely and, given the downward exploratory movement of the drops, the number of points that are actually considered as potential path candidates are severely reduced. Therefore, the complexity of the algorithm is almost linear to the number of plants multiplied by the points in each path m and by the complexity of the kdtree search ($\mathcal{O}$ (log n), n is the size of $P_{veg}$); ($\mathcal{O}(N_{plants}$ m log n)).

4.3.2 Stem Detection

Figure 9:
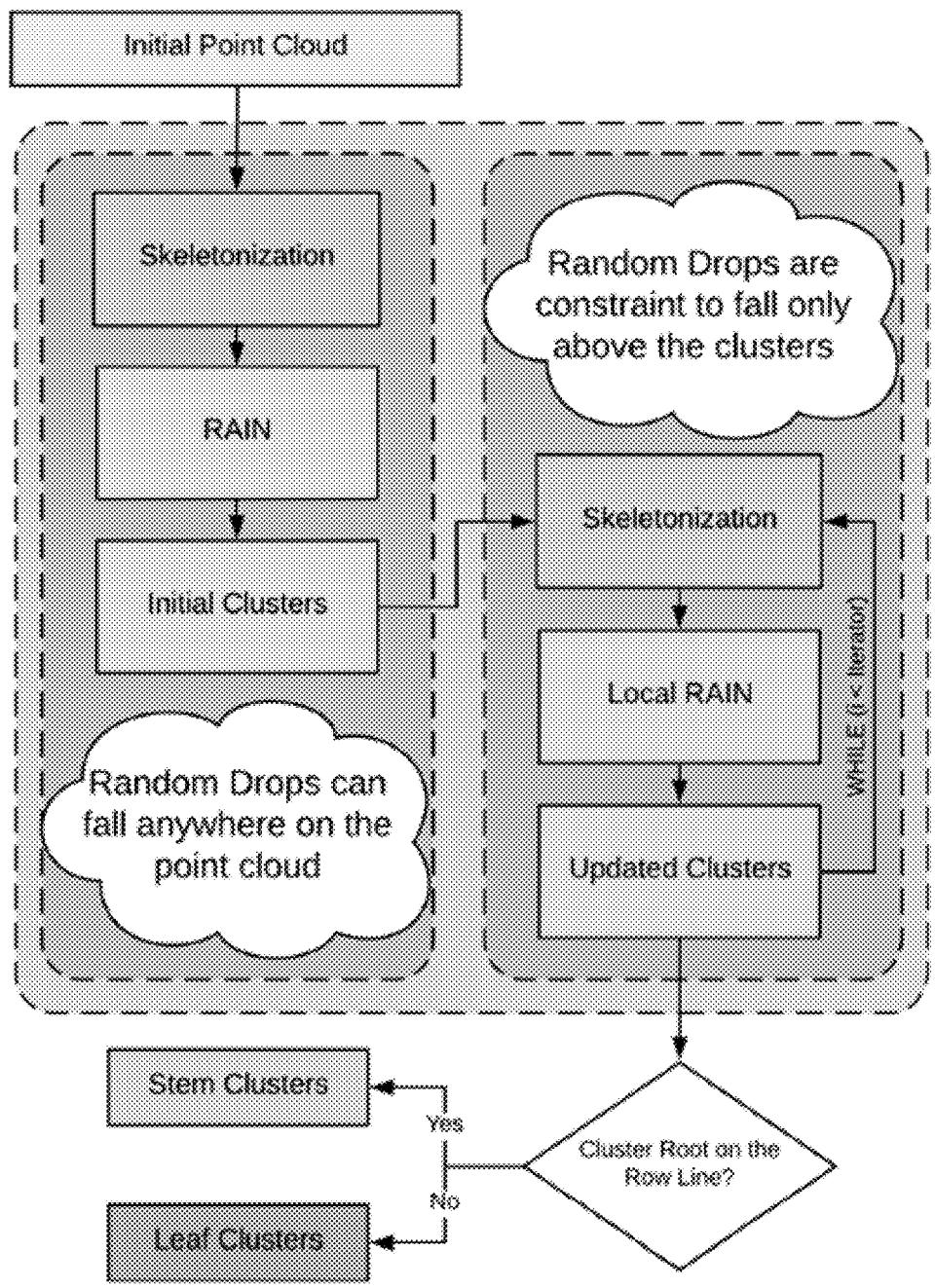
FIG. 9 is a flow chart of an example algorithm for the detection of the plant stems. The initial point cloud is treated to provide initial clusters that potentially hold the stems and then an iterative process removes the non-stem points until the clusters represent either a stem or the part of a leaf. The prior knowledge of all the stems belonging on a row is utilized to throw away the leaf clusters.

The skeletonization and RAIN algorithms described in Secs. 4.2.4 and 4.3.1 were called forth and set inside a loop to iteratively act on the $P_{veg}$. The idea is that each iteration will be performed on a progressively pruned version of $P_{veg}$ until only the stems survive. The pruning of the point cloud is inspired from the physical interpretation of RAIN and can be thought as localized raining; each plant has a "private cloud" whose rain drops are falling based on a Gaussian distribution with mean right above the plant and a very narrow standard deviation. The details of the algorithm can be seen in FIG. 9.

Figure 10:
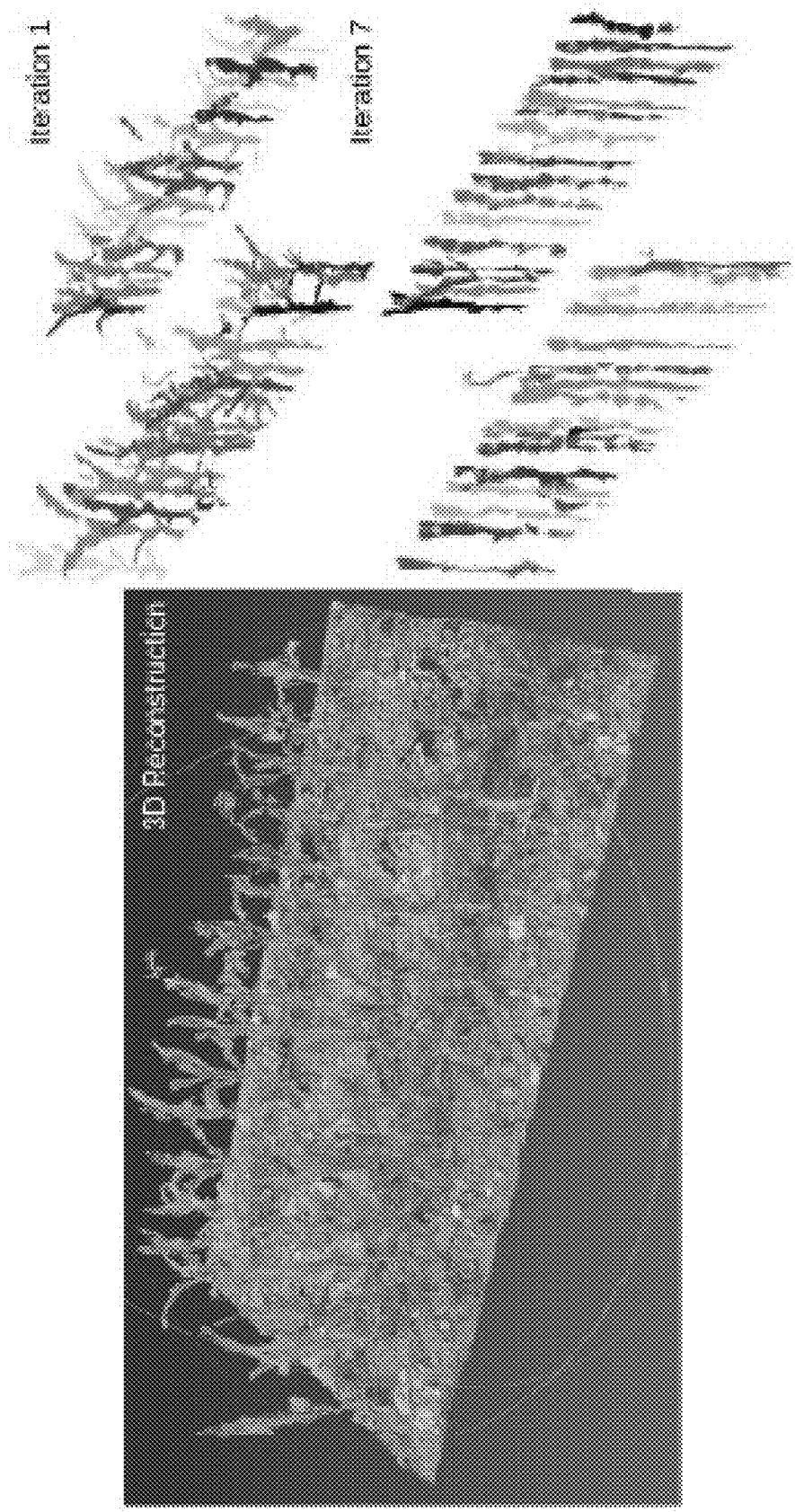
FIG. 10 is example images of the results of the iterative algorithm for the detection of stems. The original point cloud is provided on the left for comparison. The first application of the generalized skeletonization and RAIN algorithms produces clusters with stems and leaves mixed (top right), while after the 7th iteration, only the stems are left along with some clusters that represent leaves.
Figure 11:
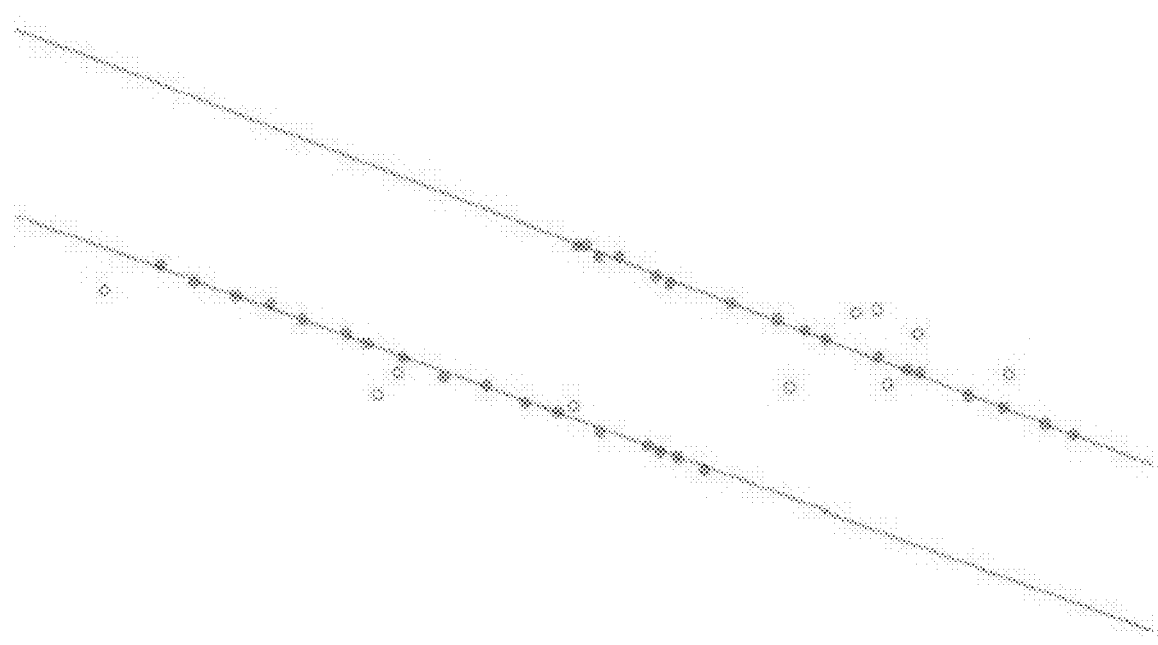
FIG. 11 is an image showing an example the demonstrates the fitting of lines in a collection of points that were created as the projections of the lowest points of the generated clusters. The line fitting RANSAC algorithm finds the two lines and then terminates since the number of the remaining points and the fitting score are not satisfactory.

The initial point cloud is treated once by the general skeletonization and RAIN algorithms to produce some initial clusters of points that may include the actual stems. The same process is then applied per cluster with the random selection of initial path points is constrained above the cluster instead of the whole point cloud. As seen in FIG. 10, a few iterations later, the stem point clusters have been exposed but with them there is a chance of capturing clusters of leaves. The filtering of the true stems is achieved by the detection of the corn rows and the prior knowledge that all stems need to be on a row; if a cluster of points does not belong on a cluster, it is discarded.

For the row detection, the lowest point of each cluster is detected and projected on the x-y plane. In case the stem is comprised by two or mode clusters, it was assumed that the projections of all these lowest points will be very close to the row line. The projection of the lowest points of all the clusters on the x-y plane and the two lines that represent the two rows can be seen in the FIG. 10. The detection of the row lines treats these projections as 2D points on a plane and uses RANSAC to fit lines iteratively. Every time a line is found successfully, its points are removed from the search space of the algorithm until there are very few points left, or the fitting score is not acceptable. Similar to the process used for the detection of the ground plane, RANSAC may be ideal for applications with noise and uncertainty; the idea of trial and error has brought substantial results both in the case of RANSAC and RAIN.

Once the points of the stems have been found, they are immediately removed from the $P_{veg}$ leaving behind points that belong to leaves. A filtering step similar to the one described in Sec. 4.2.3 cleans the leaves from any noisy or leftover stem points and the resulting point cloud is fed to the leaf segmentation algorithm described in the next section.

4.3.3 Limitations

In some instances, the density of the canopy or the difference in growth between two neighboring plants may result in one plant being overshadowed. Using the proposed algorithm, if one plant is missed during one of the iterations then it cannot be recovered. This is a limitation that can be addressed by setting hard thresholds on the height $th_{height}$ of the initialization of rain drops. This step may produce more refined results but is not generalizable and each reconstruction might need different thresholds depending on the plant growth, or the slope of the ground. The example in FIG. 10 depicts two rows of corn of the same growth stage but one row was treated with less N resulting in lower biomass. This would affect the threshold selection negatively.

A most common problem encountered in algorithms that are based on random initialization is the repeatability of the results. In the RAIN algorithm, this problem is manifested through the differences in the paths that are generated when the algorithm executes multiple times. Although the number of segmented plants is the same and the main shape of the stems is captured, the paths of the "rain drops" that generate these segments will be slightly different every time, thus having issues with small plant parts that one time will be part of the stem, while another time part of a leaf. The advantage of the randomization that allows for such elegance in the RAIN algorithm, at the same time may be its greatest limitation.

Partially reconstructed plants provide poor results, especially the ones at the borders of the reconstruction. This creates an issue on how to select the best part of the reconstruction in order to retrieve consistent and satisfactory results. This problem can be partially addressed by the row detection methodology by informing the user which rows have the best fit. The RANSAC is going to select first the line that satisfies the points giving an indication of which row has the most and better reconstructed plants.

4.4 Leaf Segmentation

Figure 12:
FIG. 12 is an image depicting only leaves of depicted plants with the ground and parts of the stems of the plants removed. After the removal of the ground and stems using the aforementioned iterative algorithm, only clusters of leaves are left. The leaf clusters have gone through a Euclidean clustering step that creates groups of at least one leaf.

Till this point, the segmentation pipeline has managed to remove the ground and parts of the stems of the plants and the leaves of the depicted plants are the only points left, as seen in the example FIG. 12. For the growth stage of the plants we are interested in ("V3" to "V8"), the canopy is not particularly dense and most of the individual leaves are observable during the 3D reconstruction.

Figure 13A:
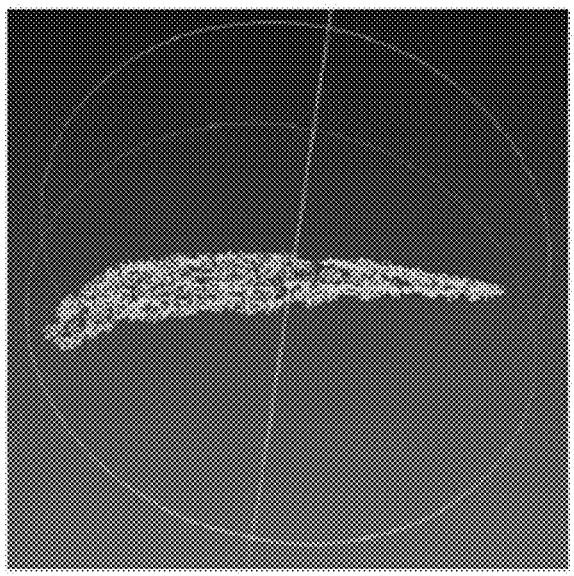
FIGS. 13A-13D are images showing examples of clusters produced by the initial Euclidean clustering step. Examples like FIG. 16A do not need extra refinement since the initial cluster represents a single leaf. Examples like FIGS. 16B-16D may need to be further refined to produce single leaf clusters.
Figure 13B:
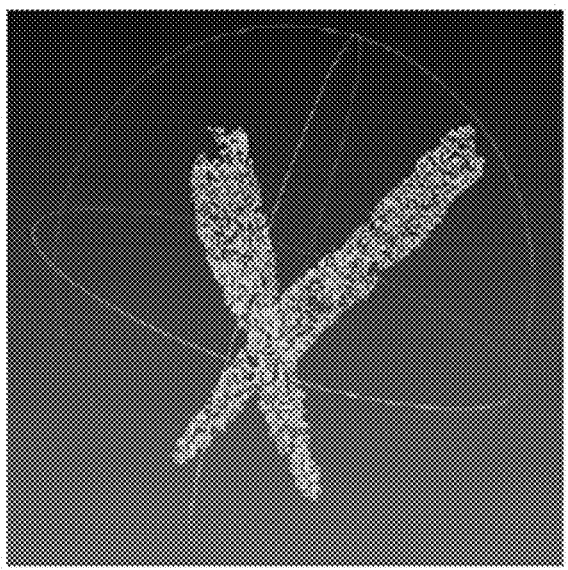
Figure 13C:
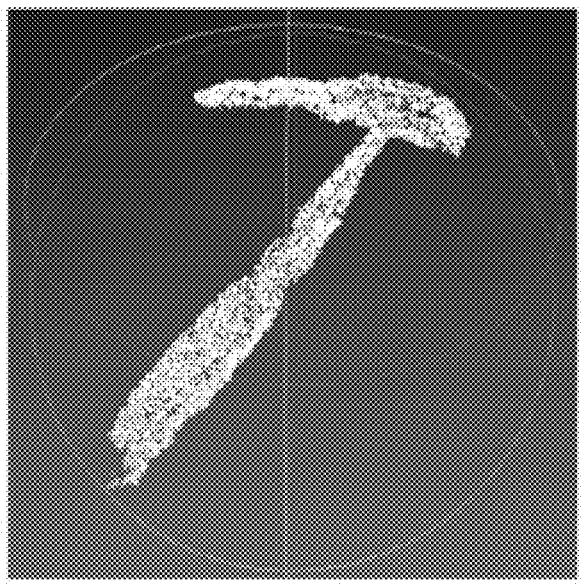
Figure 13D:
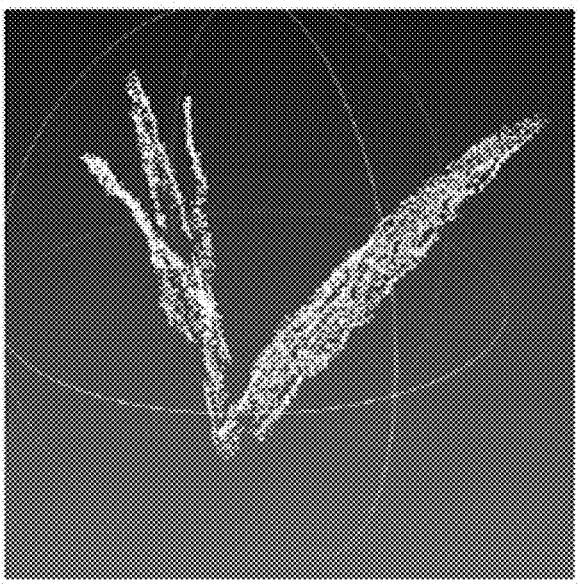

Still, occlusions and leaf intersections are present leading to a non-trivial segmentation process which concludes in two steps. Initially, a clustering technique such as the Euclidean cluster extraction combined with a statistical outlier removal is employed to break down the point cloud P into N clusters of 3D points $P_i \subset P$ with i=1, ..., N, each containing one or more single leaves, with examples seen in FIGS. 13A-13D. FIG. 13A is an example of a single leaf cluster. FIG. 13B is an example of two intersecting leaves in the same initial cluster. FIG. 13C is an example of two touching leaves in the same initial cluster. FIG. 13D is an example of four leaves at the top of a single plant in the same initial cluster.

The second step of the segmentation needs to iterate over all N clusters, leave the single leaf clusters intact, and break apart the clusters that contain more than one leaf. For this purpose, a 3D skeletonization technique is employed which acts on each point cluster $P_i$ and delivers a skeleton $S_i$ comprised from a set of connected nodes $s \subset S_i$. Each node is the centroid of a collection of neighboring 3D points and acts as their representative.

The nodes capture the topology of the leaves, which is used by the proposed algorithm to achieve a refined segmentation. In particular, only three types of nodes s are assumed; namely the endpoint nodes, the intersection nodes, and the standard nodes. Endpoints are nodes with only one immediate neighbor, while intersections have more than two immediate neighbors and standard points have exactly two.

Under this definition, it is assumed that any endpoint node signifies one end of a single leaf and that starting from an endpoint, a set of neighboring standard and intersection nodes in a smooth trajectory forms the midrib of the leaf. Referring to FIG. 14A, one can see the nodes $s_1, \ldots, s_{10}$ and $s_{11}, \ldots, s_{17}$ forming the two leaf midribs while both curves start from an endpoint. Although we assume the midribs to start from an endpoint, it is possible for them to end at any node and the decision is based on the smoothness of the curve.

In order to define a criterion for the smoothness of a curve, we treat the nodes of the skeleton are treated as measurements of the trajectory of a physical object in 3D and a Kalman filter is employed to decide whether a node belongs to the midrib or not. This segmentation refinement process referred to as Skeleton Kalman Filtering (SKF). Specifically, the following model is employed:

$$x_k = x_{k-1} + v_{k-1}\Delta t + \tfrac{1}{2}\alpha\Delta t^2$$

$$v_k = v_{k-1} + \alpha\Delta t \qquad (4.6)$$

which is transformed, as used in Kalman filtering, in the matrix form:

$$\begin{pmatrix} x_k \\ v_k \end{pmatrix} = \begin{pmatrix} I_3 & I_3\Delta t \\ 0_3 & I_3 \end{pmatrix} x_{k-1} + \begin{pmatrix} \frac{\Delta t^2}{2} \\ \Delta t \end{pmatrix} \alpha \qquad (4.7)$$

with $x_k = [x, y, z]^T$, $v_k = [\dot{x}\dot{y}\dot{z}]^T$, $\Delta t = 1$, $\alpha = 0.01$, $I_3 \in \mathbb{R}^{3 \times 3}$ identity matrix, and $0_3 \in \mathbb{R}^{3 \times 3}$ zero matrix. At the same time, the measurements $z_k = [z_{k_x}, z_{k_y}, z_{k_z}]^T$ take the form:

$$z_k = (I_3 | 0_3) x_{k-1}, \qquad (4.8)$$

and the model and measurement uncertainty matrices Q and R respectively are:

$$Q = \begin{pmatrix} I_3\frac{\Delta t^4}{4} & I_3\frac{\Delta t^3}{2} \\ I_3\frac{\Delta t^3}{2} & I_3\Delta t^2 \end{pmatrix}, \; R = (I_3 \sigma^2), \qquad (4.9)$$

with $\sigma = 0.1$.

The position part $x_k$ of the state vector is initialized with the first endpoint of the midrib, velocity $v_k = [0,0,0]^T$ and the Kalman filter is applied iteratively. At each iteration the estimated position $x_{k_{est}}$ is compared with the next neighboring node(s) (that act as measurements $z_k$) and based on a distance threshold the node is considered part or the end of the midrib.

$$\|x_{k_{est}} - z_k\|_2 < d_{threshold}. \qquad (4.10)$$

Figure 14B:
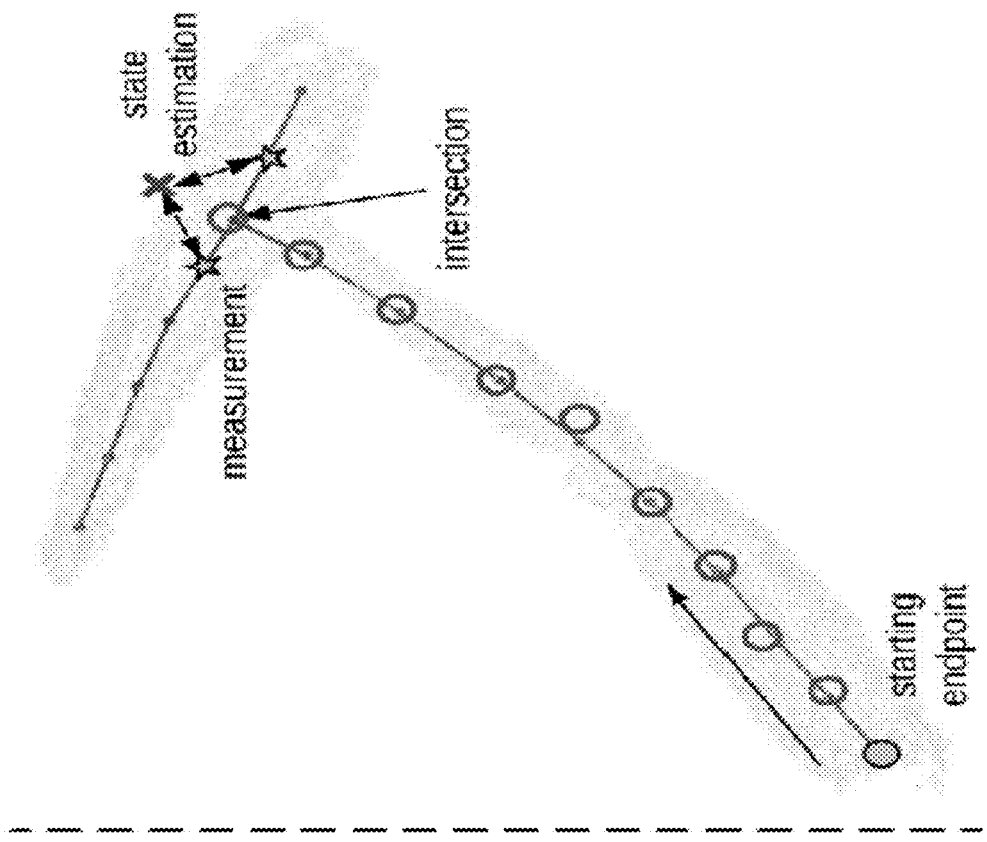
FIG. 14B is an example of the SKF algorithm starting from node $s_1$. Kalman filtering is used iteratively to make decisions on the nodes that belong to the midrib. The circles represent estimates on the position of the nodes $xk_{est}$ that have been found to be close to their respective node-measurements (shown as dots along the lines). The cross presents the position estimate that is far away from its respective measurements (stars), thus signifying that $s_{10}$ is an end-node for the particular leaf.
Figure 14A:
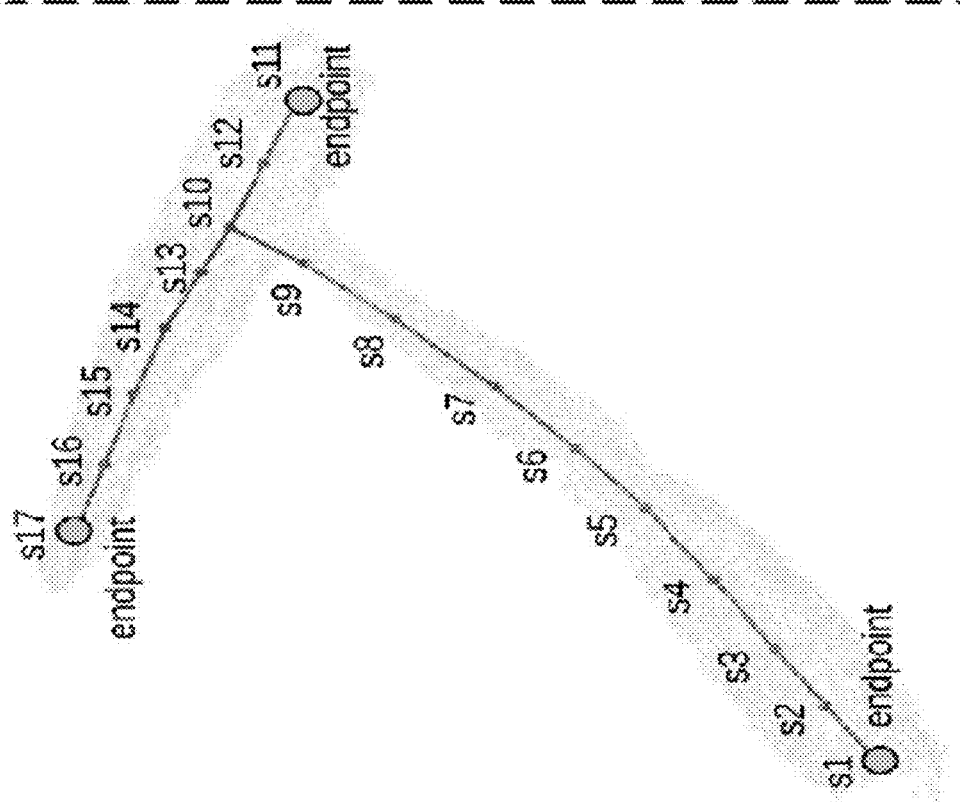
FIG. 14A is an image showing an example of a 3D skeleton of two overlapping leaves. Three endpoint nodes ($s_1$, $s_{11}$, and $s_{17}$), one intersection node ($s_{10}$), and several standard nodes ($s_2$-$s_9$, $s_{12}$, and $s_{13}$-$s_{16}$) are visible.

As seen in FIG. 14B, the skeleton branch that initiates from the starting endpoint $s_1$ applies Kalman filtering and adds the standard points up to $s_{10}$ to the midrib. The filter estimates that the next node $s_{11}$ should be at the "cross" for the smoothness of the midrib to persist. Nevertheless, the actual neighboring nodes (stars) are not consistent with the estimate meaning that the intersection node $s_{10}$ signifies the end of the leaf.

4.4.1 Limitations

The proposed methodology may depend heavily on the quality of the 3D reconstruction for the segmentation of individual leaves. Especially in later growth stages, the density of the canopy occludes heavily the lower leaves resulting in their partial reconstruction. This in turn affects significantly the number of leaves that are estimated and therefore poses problems later in the extraction of biometrics.

A partial 3D reconstruction also affects the SKF segmentation step which utilizes the 3D skeletonization to separate the independent leaves. When the leaf surface has a large hole due to lack of texture in the reconstruction process, the skeleton is forced to create unnecessary branches which may end up in the over-segmentation of the leaf. This problem is partially addressed by the flexibility of the SOM and the summation of all the final leaf areas, nevertheless, it introduces inaccuracies to the final area computation.

4.5 3D Datasets

The several developed algorithms were executed on both artificial and real corn plants. Due to the complexity of the problem, the reproducibility of the experiments, and the accuracy in the collection of the ground truth measurements it was decided to validate the numerical correctness of some complex biometrics on artificial corn stalks, while the real corn reconstructions were limited in the span of "V3" and "V7" growth stages. Dense canopies with heavy occlusions in the lower leaves were dismissed as not applicable to the developed algorithms.

4.5.1 Artificial Corn Data

A total of six artificial plants with similar biometrics were used that are based on real corn models at a "V6" growth stage. The basic biometrics (height, leaf length, inter-nodal distance) were measured directly. The areas of their leaves were approximated by the formula: L*W*k, with L the length of the leaf from the stem to the tip, W the maximum width, and the constant k=0.75 was selected based on literature as a viable approximation of the leaf area.

The 3D reconstructions were created offline using the VisualSFM toolbox with the number of input images varying from 18 to 24 and the images were collected with a handheld Olympus TG-4 camera of 1440×1920 pixel resolution. A sample sparse reconstruction output from the VisualSFM toolbox can be seen in FIG. 6, while dense reconstruction results produced via the use of the PMVS tool are seen in the FIG. 21B.

Figure 16:
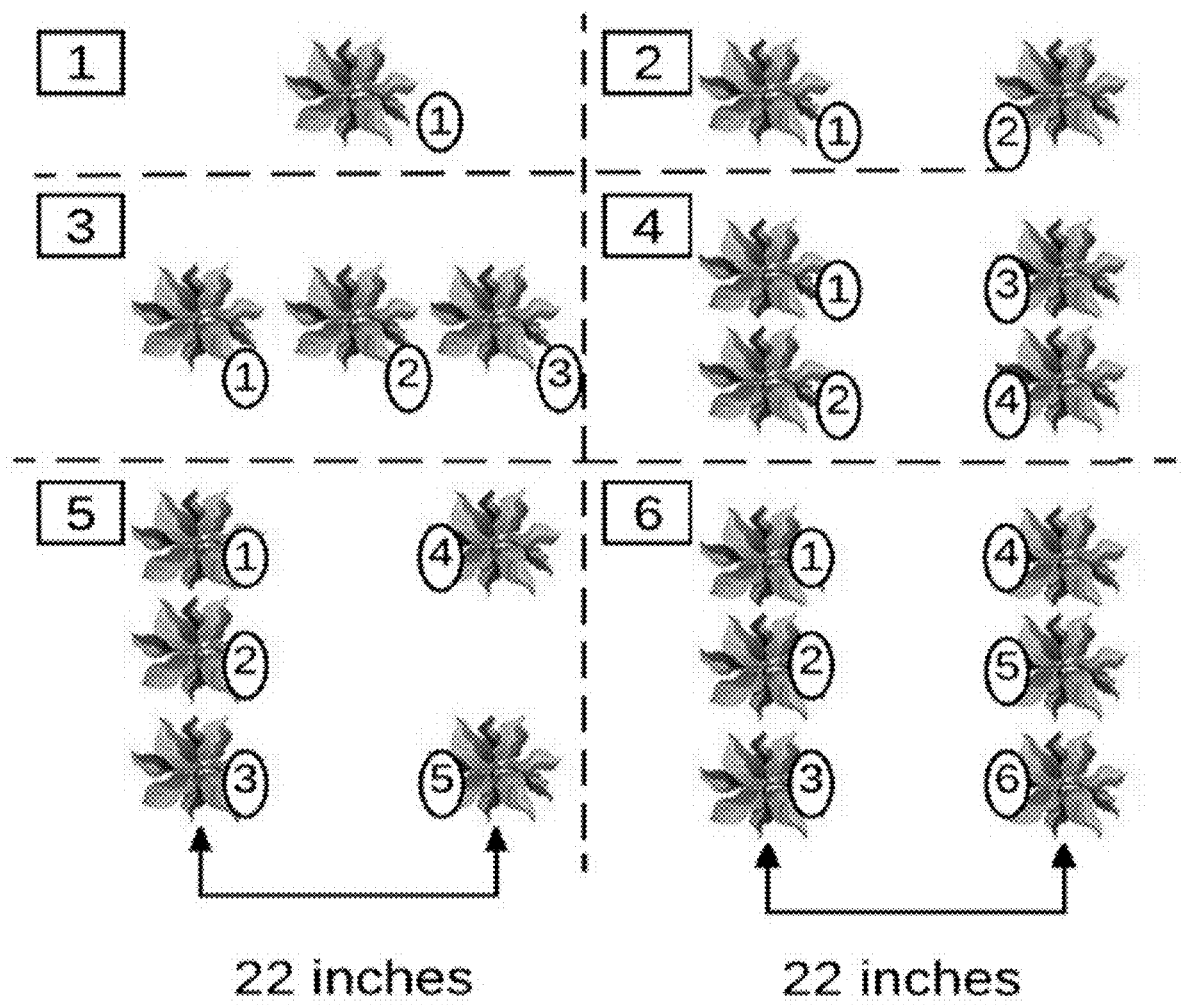
FIG. 16 is a conceptual diagram of the experimental setup involved six different corn plant configurations with increasing complexity. The numbers inside the squares depict the experiment number and the numbers in the circles represent the plant identification. One to six plants were used in realistic scenarios keeping distances between rows at 22 inches, an example standard corn row distance used at the United States farmlands.

Six different configurations of artificial corn stalks were considered with increasing complexity which, as seen in FIG. 16 representing experiments #1-#6, try to mimic realistic scenarios and assist in verifying the sensibility of the proposed method. In experiment #1 a single plant is reconstructed showing how the algorithm behaves with minimal occlusion. The same goes for experiment #2 where non-overlapping leaves are considered in a standard 22 inch distance between two corn rows. Experiments #3 through #6 show cases of severe overlap and occlusion with increasing number of plants and #5 shows a case where the row is missing a plant due to seeding error.

4.5.2 Real Corn Data

Figures 15A, 15B:
FIG. 15A is an example of one of the images used for the construction of the 3D model visible on the right.
FIG. 15B is an image of the dense 3D reconstruction of real corn plants in the field is provided as reference for visual comparison with the artificial corn.

Fifteen video sequences from four different field locations in Minnesota (Becker, Waseca, St. Paul, and Rosemount 3.6) were collected, with corn stages ranging from "V3" to "V7" and row distances either 22 or 30 inches. The sequences were collected by a DJI Matrice 100 UAV with a DJI Z3 camera and span 30 seconds each. The 3D reconstructions were created offline using again the VisualSFM toolbox with the input images retrieved as frames from the video sequences. Between 80 and 120 images of 3840×2160 pixel resolution were used to create each reconstruction. Image samples and their 3D reconstructions can be seen in FIGS. 15A and 15B. FIG. 15A is one of the images used for the construction of the 3D model visible on the right. FIG. 15B is an image of the dense 3D reconstruction of real corn plants in the field, which is provided as a reference for visual comparison with the artificial corn.

Various examples have been described. These and other examples are within the scope of the following example clauses and claims.

Clause 1. A system for detecting crop biometrics, the system comprising an unmanned vehicle comprising at least one imaging device; and a crop modeling device communicatively coupled to the imaging device, wherein the crop modeling device comprises a processor configured to receive, from the imaging device, a plurality of images of a crop of plants in a field, generate, based on the plurality of images, a three-dimensional (3D) model of the plants, wherein the 3D model defines locations and orientations of leaves and stems of the plants, and determine, based on the 3D model, at least one biometric parameter of at least one plant in the crop.

Clause 2. The system of clause 1, wherein the plurality of images includes images taken at different locations and different orientations along the field or adjacent to the field.

Clause 3. The system of clause 1 or 2, wherein the plurality of images includes images taken at different locations and different orientations along a substantially circular predetermined path about the field.

Clause 4. The system of any one of clauses 1 to 3, wherein the processor is configured to generate a point cloud reconstruction of the plants and generate the 3D model of the plants based on the point cloud reconstruction.

Clause 5. The system of clause 4, wherein each point of the point cloud reconstruction is represented by three spatial dimensions, and three chromatic dimensions.

Clause 6. The system of clauses 4 or 5, wherein the processor is further configured to skeletonize the reconstruction to reduce the number of points in the point cloud reconstruction.

Clause 7. The system of any one of clauses 1 to 6, wherein the 3D model comprises a plurality of labels, each respective label of the plurality of labels associated with a respective element of the 3D model, each label defining the respective element of the 3D model as being part of a stems, a leaf, or soil.

Clause 8. The system of any one of clauses 1 to 7, wherein the processor is further configured to segment the 3D model to determine a plurality of leaves attached to a respective stem of each plant of the crop of plants.

Clause 9. The system of clause 8, wherein the processor is further configured to further segment the 3D model to determine respective leaves of the plurality of leaves attached to the respective stem.

Clause 10. The system of any one of clauses 1 to 9, wherein the unmanned vehicle comprises an unmanned aerial vehicle or an unmanned ground vehicle.

Clause 11. A technique for detecting crop biometrics, the technique comprising receiving, by a processor, from an imaging device of an unmanned vehicle, a plurality of images of a crop of plants in a field; generating, by the processor, based on the plurality of images, a three-dimensional (3D) model of the plants, wherein the 3D model defines locations and orientations of leaves and stems of the plants; and determining, by the processor, based on the 3D model, at least one biometric parameter of at least one plant in the crop.

Clause 12. The technique of clause 11, wherein the plurality of images includes images taken at different locations and different orientations along the field or adjacent to the field.

Clause 13. The technique of clause 11 or 12, wherein the plurality of images includes images taken at different locations and different orientations along a substantially circular predetermined path about the field.

Clause 14. The technique of any one of clauses 11 to 13, further comprising generating, by the processor, based on the images, a point cloud reconstruction of the plants, wherein the 3D model is based on the reconstruction.

Clause 15. The technique of clause 14, wherein each point of the point cloud reconstruction is represented by three spatial dimensions, and three chromatic dimensions.

Clause 16. The technique of clauses 14 or 15, further comprising skeletonizing, by the processor, the reconstruction to reduce the number of points in the point cloud reconstruction.

Clause 17. The technique of any one of clauses 11 to 16, wherein the 3D model comprises a plurality of labels, each respective label of the plurality of labels associated with a respective element of the 3D model, each label defining the respective element of the 3D model as being part of a stems, a leaf, or soil.

Clause 18. The technique of any one of clauses 11 to 17, further comprising, by the processor, segmenting the 3D model to determine a plurality of leaves attached to a respective stem of each plant of the crop of plants.

Clause 19. The technique of clause 18, further comprising, by the processor, further segmenting the 3D model to determine respective leaves of the plurality of leaves attached to the respective stem.

Clause 20. The technique of any one of clauses 11 to 19, wherein the unmanned vehicle comprises an unmanned aerial vehicle or an unmanned ground vehicle.

Clause 21. A crop modeling device comprising a processor and a non-transitory computer readable storage medium comprising instructions, that when executed, cause the processor to receive, from an imaging device of an unmanned vehicle, a plurality of images of a crop of plants in a field, generate, based on the plurality of images, a three-dimensional (3D) model of the plants, wherein the 3D model defines locations and orientations of leaves and stems of the plants, and determine, based on the 3D model, at least one biometric parameter of at least one plant in the crop.

Clause 22. The crop modeling device of clause 21, wherein the plurality of images includes images taken at different locations and different orientations along the field or adjacent to the field.

Clause 23. The crop modeling device of clause 21 or 22, wherein the plurality of images includes images taken at different locations and different orientations along a substantially circular predetermined path about the field.

Clause 24. The crop modeling device of any one of clauses 21 to 23, wherein the non-transitory computer readable storage medium further comprises instructions, that when executed, cause the processor to generate, based on the plurality of images, a point cloud reconstruction of the plants, and generate the 3D model of the plants based on the point cloud reconstruction.

Clause 25. The crop modeling device of clause 24, wherein each point of the point cloud reconstruction is represented by three spatial dimensions, and three chromatic dimensions.

Clause 26. The crop modeling device of clauses 24 or 25, wherein the non-transitory computer readable storage medium further comprises instructions, that when executed, cause the processor to skeletonize the reconstruction to reduce the number of points in the point cloud reconstruction.

Clause 27. The crop modeling device of any one of clauses 21 to 26, wherein the 3D model includes a plurality of labels, each respective label of the plurality of labels associated with a respective element of the 3D model, each label defining the respective element of the 3D model as being part of a stems, a leaf, or soil.

Clause 28. The crop modeling device of any one of clauses 21 to 27, wherein the non-transitory computer readable storage medium further comprises instructions, that when executed, cause the processor to segment the 3D model to determine a plurality of leaves attached to a respective stem of each plant of the crop of plants.

Clause 29. The crop modeling device of clause 28, wherein the non-transitory computer readable storage medium further comprises instructions, that when executed, cause the processor to further segment the 3D model to determine respective leaves of the plurality of leaves attached to the respective stem.

Clause 30. The crop modeling device of any one of clauses 1 to 29, wherein the unmanned vehicle comprises an unmanned aerial vehicle or an unmanned ground vehicle.

What is claimed is:

1. A system for detecting crop biometrics, the system comprising a crop modeling device communicatively coupled to an imaging device, wherein the crop modeling device comprises processing circuitry configured to:
   receive, from the imaging device, a plurality of images of a crop of plants in a field,
   generate, based on the plurality of images, a three-dimensional (3D) model of the plants, wherein the 3D model defines locations and orientations of leaves and stems of the plants, and
   determine, based on the 3D model, at least one biometric parameter of at least one plant in the crop, wherein the processor is configured to generate the 3D model of the plants by at least:
      generating an initial point cloud reconstruction of the plants in the field based on the plurality of images,
      simulating respective routes of a plurality of randomly selected points of the initial point cloud by:
         identifying a ground plane within a 3D space of the initial point cloud reconstruction,
         simulating, for each of a plurality of randomly selected points within the initial point cloud, point-by-point movement from an initial position of the selected point within the initial point cloud reconstruction towards the identified ground plane based on a height of respective points within the initial point cloud, and
         determining the respective simulated routes for each point of the plurality of randomly selected points based on the simulated point-by-point movement to generate a plurality of simulated respective routes, and
      detecting respective stems of the plants based on the plurality of simulated respective routes, wherein detecting the respective stems of the plants based on the plurality of simulated respective routes includes selecting only a subset of respective simulated routes of the plurality of simulated respective routes corresponding to the respective stems of the plants in the field, wherein the subset of the respective simulated routes includes more than one simulated route, and wherein the subset of simulated respective routes of the plurality of simulated respective routes is selected at least in part based on a frequency of simulated respective routes that are common to each other.

2. The system of claim 1, wherein the plurality of images includes images taken at different locations and different orientations along the field or adjacent to the field.

3. The system of claim 1, wherein the plurality of images includes images taken at different locations and different orientations along a substantially circular predetermined path about the field.

4. The system of claim 1, wherein each point of the initial point cloud reconstruction is represented by three spatial dimensions, and three chromatic dimensions.

5. The system of claim 1, wherein, to generate the initial point cloud reconstruction, the processing circuitry is configured to, prior to detecting the respective stems:
   align respective points used for the initial point cloud reconstruction within the 3D space relative to the ground plain identified in the 3D space; and
   skeletonize the respective points aligned within the 3D space to reduce the number of points in the initial point cloud reconstruction.

6. The system of claim 1, wherein the 3D model comprises a plurality of labels, each respective label of the plurality of labels associated with a respective element of the 3D model, each label defining the respective element of the 3D model as being part of a stems, a leaf, or soil.

7. The system of claim 1, further comprising an unmanned vehicle comprising the imaging device, wherein the unmanned vehicle comprises an unmanned aerial vehicle or an unmanned ground vehicle.

8. A method for detecting crop biometrics, the method comprising:
   receiving, by processing circuitry and from an imaging device, a plurality of images of a crop of plants in a field;
   generating, by the processing circuitry, based on the plurality of images, a three-dimensional (3D) model of the plants, wherein the 3D model defines locations and orientations of leaves and stems of the plants; and
   determining, by the processing circuitry, based on the 3D model, at least one biometric parameter of at least one plant in the crop,
   wherein generating the 3D model of the plants comprises:
      generating an initial point cloud reconstruction of the plants in the field based on the plurality of images,
      simulating respective routes of a plurality of randomly selected points of the initial point cloud, wherein simulating the respective routes comprises:
         identifying a ground plane within a 3D space of the initial point cloud reconstruction, simulating, for each of a plurality of randomly selected points within the initial point cloud, point-by-point movement from an initial position of the selected point within the initial point cloud reconstruction towards the identified ground plane based on a height of respective points within the initial point cloud, and determining the respective simulated routes for each point of the plurality of randomly selected points based on the simulated point-by-point movement to generate a plurality of simulated respective routes, and detecting respective stems of the plants based on the plurality of simulated respective routes, wherein detecting the respective stems of the plants based on the plurality of simulated respective routes includes selecting only a subset of respective simulated routes of the plurality of simulated respective routes corresponding to the respective stems of the plants in the field, wherein the subset of the respective simulated routes includes more than one simulated route, and wherein the subset of simulated respective routes of the plurality of simulated respective routes is selected at least in part based on a frequency of simulated respective routes that are common to each other.

9. The method of claim 8, wherein the plurality of images includes images taken at different locations and different orientations along the field or adjacent to the field.

10. The method of claim 8, wherein the plurality of images includes images taken at different locations and different orientations along a substantially circular predetermined path about the field.

11. The method of claim 8, wherein each point of the point cloud reconstruction is represented by three spatial dimensions, and three chromatic dimensions.

12. The method of claim 8, further comprising, prior to detecting the respective stems:
aligning respective points used for the initial point cloud reconstruction within the 3D space relative to the ground plain identified in the 3D space; and
skeletonizing, by the processing circuitry, the respective points aligned within the 3D space to reduce the number of points in the point cloud reconstruction.

13. The method of claim 8, wherein the 3D model comprises a plurality of labels, each respective label of the plurality of labels associated with a respective element of the 3D model, each label defining the respective element of the 3D model as being part of a stems, a leaf, or soil.

14. The method of claim 8, wherein the imaging device is part of an unmanned vehicle, and wherein the unmanned vehicle comprises an unmanned aerial vehicle or an unmanned ground vehicle.

15. A crop modeling device comprising processing circuitry and a non-transitory computer readable storage medium comprising instructions, that when executed, cause the processing circuitry to:

receive, from an imaging device, a plurality of images of a crop of plants in a field, generate, based on the plurality of images, a three-dimensional (3D) model of the plants by at least:
generating an initial point cloud reconstruction of the plants in the field based on the plurality of images,
simulating respective routes of a plurality of randomly selected points of the initial point cloud by:
identifying a ground plane within a 3D space of the initial point cloud reconstruction,
simulating, for each of a plurality of randomly selected points within the initial point cloud, point-by-point movement from an initial position of the selected point within the initial point cloud reconstruction towards the identified ground plane based on a height of respective points within the initial point cloud, and
determining the respective simulated routes for each point of the plurality of randomly selected points based on the simulated point-by-point movement to generate a plurality of simulated respective routes, and
detecting respective stems of the plants based on the plurality of simulated respective routes, wherein detecting the respective stems of the plants based on the plurality of simulated respective routes includes selecting only a subset of respective simulated routes of the plurality of simulated respective routes corresponding to the respective stems of the plants in the field, wherein the subset of the respective simulated routes includes more than one simulated route, and wherein the subset of simulated respective routes of the plurality of simulated respective routes is selected at least in part based on a frequency of simulated respective routes that are common to each other,
wherein the 3D model defines locations and orientations of leaves and stems of the plants, and
determine, based on the 3D model, at least one biometric parameter of at least one plant in the crop.

16. The system of claim 1, wherein the processing circuitry is configured to, following the detection of the respective stems of the plants, segment leaves connected to the respective stems using the initial point cloud reconstruction.

17. The system of claim 16, wherein the plants in the field include at least one of overlapping or occluding leaves, wherein the processing circuitry is configured to segment the leaves to separate the at least one of overlapping or occluding leaves in the 3D model.

18. The system of claim 16, wherein the processing circuitry is configured to apply a skeleton Kalman filtering process to segment the leaves.

19. The system of claim 16, wherein the processing circuitry is configured to remove the respective points in the initial point cloud reconstruction corresponding to the detected stems prior to segmenting the leaves.

* * * * *